United States Patent
Kim et al.

(10) Patent No.: US 12,022,387 B2
(45) Date of Patent: Jun. 25, 2024

(54) METHOD AND APPARATUS FOR TRANSMITTING AND RECEIVING TERMINAL SUPPORT INFORMATION IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Jeongho Yeo, Gyeonggi-do (KR); Jinkyu Kang, Gyeonggi-do (KR); Youngbum Kim, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 334 days.

(21) Appl. No.: 17/421,588

(22) PCT Filed: Jan. 3, 2020

(86) PCT No.: PCT/KR2020/000088
§ 371 (c)(1),
(2) Date: Jul. 8, 2021

(87) PCT Pub. No.: WO2020/145576
PCT Pub. Date: Jul. 16, 2020

(65) Prior Publication Data
US 2022/0159568 A1    May 19, 2022

(30) Foreign Application Priority Data

Jan. 11, 2019    (KR) .................. 10-2019-0004162

(51) Int. Cl.
*H04W 72/21*    (2023.01)
*H04W 52/02*    (2009.01)
*H04W 88/06*    (2009.01)

(52) U.S. Cl.
CPC ....... *H04W 52/0212* (2013.01); *H04W 72/21* (2023.01); *H04W 88/06* (2013.01)

(58) Field of Classification Search
CPC . H04W 56/0045; H04W 56/00; H04W 16/28; H04W 84/04; H04W 88/08;
(Continued)

(56) References Cited

U.S. PATENT DOCUMENTS 9,736,884 B2 *   8/2017   Abedi ............... H04W 52/0219
2014/0044029 A1 *  2/2014  Chou ................ H04W 52/0216
                                                            370/331
(Continued)

FOREIGN PATENT DOCUMENTS

EP    3 780 767        4/2019
EP    3278504 B1 * 11/2020 ......... H04L 12/1446
(Continued)

OTHER PUBLICATIONS

Vivo, "Discussion on UE Adaptation to the traffic and UE Power Consumption Characteristics", R1-1812330, 3GPP TSG RAN WG1 Meeting #95, Nov. 12-18, 2018, 7 pages.
(Continued)

*Primary Examiner* — Nathan S Taylor
(74) *Attorney, Agent, or Firm* — The Farrell Law Firm, P.C.

(57) ABSTRACT

The present disclosure provides a method of transmitting and receiving user equipment (UE) assistance information in a wireless communication system, the method including: receiving, from a base station, information about at least one power saving mode candidate set; selecting at least one of the at least one power saving mode candidate set; transmitting, to the base station, UE assistance information including information about the selected at least one power saving mode candidate; and performing communication with the
(Continued)

base station based on a power saving mode determined by the base station based on the UE assistance information.

13 Claims, 11 Drawing Sheets

(58) Field of Classification Search
CPC ... H04W 56/001; H04W 84/06; H04W 72/20; H04W 72/04; H04W 28/04; H04W 92/18; H04B 7/18589; H04B 7/185; H04L 1/1812; H04L 1/1861; H04L 1/1864; H04L 1/1893; H04L 1/1896; H04L 5/0055; H04L 5/0078; H04L 1/1607; H04L 1/18; H04L 1/16; H04L 5/00
See application file for complete search history.

(56) References Cited

U.S. PATENT DOCUMENTS

| | | | |
|---|---|---|---|
| 2014/0071872 A1* | 3/2014 | Guo | H04W 52/0235 370/311 |
| 2014/0092799 A1* | 4/2014 | Jain | H04W 76/27 370/311 |
| 2015/0230179 A1* | 8/2015 | Gupta | H04W 74/0858 370/311 |
| 2015/0237576 A1* | 8/2015 | Lee | H04W 76/28 370/311 |
| 2016/0100360 A1* | 4/2016 | Liu | H04W 72/21 370/311 |
| 2016/0100362 A1* | 4/2016 | Palanisamy | H04W 72/23 370/311 |
| 2017/0013515 A1* | 1/2017 | Bangolae | H04W 36/0055 |
| 2017/0367044 A1* | 12/2017 | Fujishiro | H04W 68/02 |
| 2017/0367047 A1* | 12/2017 | Fujishiro | H04W 8/22 |
| 2018/0014347 A1* | 1/2018 | Nagasaka | H04W 8/22 |
| 2018/0129732 A1* | 5/2018 | Pelleg | G06F 16/3344 |
| 2018/0302886 A1* | 10/2018 | Pan | H04W 72/21 |
| 2019/0007899 A1* | 1/2019 | Vrzic | H04W 8/02 |
| 2019/0215729 A1* | 7/2019 | Oyman | H04L 65/1016 |
| 2019/0223111 A1* | 7/2019 | Wong | H04W 24/02 |
| 2020/0008183 A1* | 1/2020 | Chen | H04W 72/20 |
| 2020/0053699 A1* | 2/2020 | Chen | H04W 72/02 |
| 2020/0053768 A1* | 2/2020 | Chen | H04W 72/20 |
| 2020/0204291 A1* | 6/2020 | Awoniyi-Oteri | H04L 25/0226 |
| 2020/0204959 A1* | 6/2020 | Yang | H04L 65/1059 |
| 2020/0229098 A1* | 7/2020 | Cheng | H04W 52/0248 |
| 2020/0367234 A1* | 11/2020 | Bergström | H04W 72/0446 |
| 2020/0383168 A1* | 12/2020 | Nagasaka | H04W 52/0212 |
| 2021/0185614 A1* | 6/2021 | Zhou | H04L 5/0051 |
| 2021/0227534 A1* | 7/2021 | Määttänen | G08G 5/0069 |
| 2021/0360495 A1* | 11/2021 | Lovlekar | H04W 36/00837 |

FOREIGN PATENT DOCUMENTS

| | | | | |
|---|---|---|---|---|
| EP | 3780767 A1 * | 2/2021 | | H04W 52/0209 |
| EP | 3500033 B1 * | 3/2021 | | H04W 36/00 |
| KR | 1020190120665 | 10/2019 | | |
| WO | WO-2013171577 A1 * | 11/2013 | | H04W 28/18 |
| WO | WO-2020091546 A1 * | 5/2020 | | |

OTHER PUBLICATIONS

Sony, "Conditions and Procedures for Adaptation of Power Consumption Characteristics", R1-1812750, 3GPP TSG RAN WG1 Meeting #95, Nov. 12-16, 2018, 6 pages.
Qualcomm Incorporated, "UE Adaptation to the Traffic and UE Power Consumption Characteristics", R1-1813447, 3GPP TSG-RAN WG1 Meeting #95, Nov. 12-16, 2018, 20 pages.
3rd Generation Partnership Project; Technical Specification Group Radio Access Network; NR; Study on UE Power Saving (Release 16), 3GPP TR 38.840 V0.1.0, Nov. 2018, 24 pgs.
International Search Report dated Apr. 9, 2020 issued in counterpart application No. PCT/KR2020/000088, 15 pages.

* cited by examiner

METHOD AND APPARATUS FOR TRANSMITTING AND RECEIVING TERMINAL SUPPORT INFORMATION IN WIRELESS COMMUNICATION SYSTEM

PRIORITY

This application is a National Phase Entry of PCT International Application No. PCT/KR2020/000088 which was filed on Jan. 3, 2020, and claims priority to Korean Patent Application No. 10-2019-0004162, which was filed on Jan. 11, 2019, the entire content of each of which is incorporated herein by reference.

TECHNICAL FIELD

The present disclosure relates to a method and apparatus for transmitting user equipment (UE) assistance information for reducing power consumption of a terminal in a wireless communication system.

BACKGROUND ART

To meet the increase in demand with respect to wireless data traffic after the commercialization of $4^{th}$ generation (4G) communication systems, considerable efforts have been made to develop improved $5^{th}$ generation (5G) communication systems or pre-5G communication systems. For this reason, 5G communication systems or pre-5G communication systems are called beyond 4G network communication systems or post long term evolution (LTE) systems. To achieve a high data rate, the implementation of 5G communication systems in an ultra-high frequency band (millimeter wave (mmWave)) (e.g., a 60 GHz band) is under consideration. To alleviate propagation path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system are being discussed. Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, are being developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As it is possible to provide various services according to the development of wireless communication systems, there is a need for a method for seamlessly providing these services.

DESCRIPTION OF EMBODIMENTS

Technical Problem

Embodiments disclosed herein provide a method and apparatus for transmitting user equipment (UE) assistance information for reducing power consumption of a terminal in a wireless communication system.

Solution to Problem

Embodiments disclosed herein provide a method and apparatus for transmitting user equipment (UE) assistance information for reducing power consumption of a terminal in a wireless communication system.

Advantageous Effects of Disclosure

Embodiments disclosed herein provide an apparatus and method for effectively providing services in a mobile communication system.

BEST MODE

Figure 1:
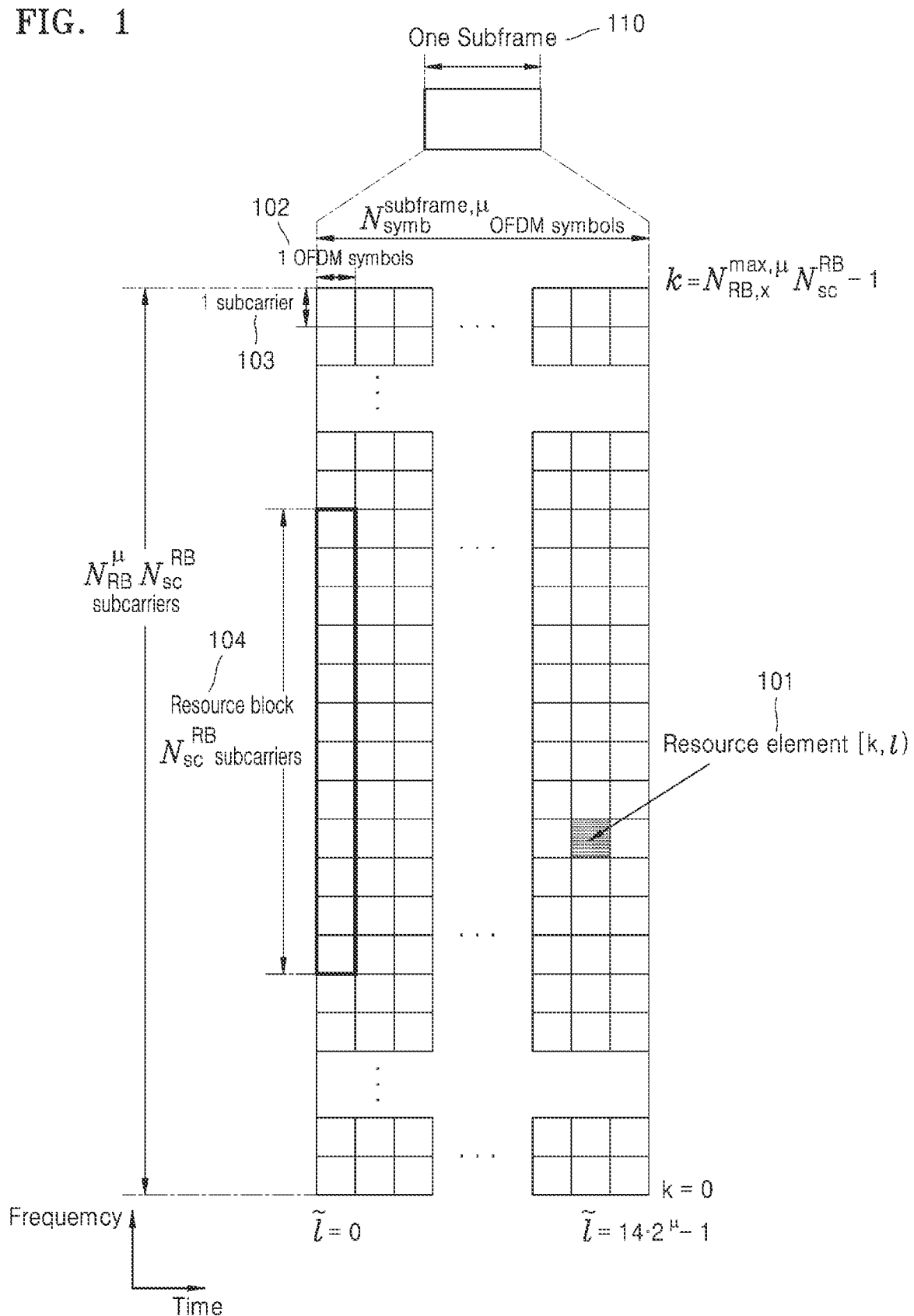
FIG. 1 is a diagram illustrating a basic structure of a time-frequency domain in $5^{th}$ generation (5G), according to an embodiment of the present disclosure.

According to an embodiment of the present disclosure, a method, performed by a user equipment (UE), of transmitting and receiving UE assistance information in a wireless communication system, may include: receiving, from a base station, information about at least one power saving mode candidate set; selecting at least one of the at least one power saving mode candidate set; transmitting, to the base station, UE assistance information including information about the selected at least one power saving mode candidate; and performing communication with the base station based on a power saving mode determined by the base station based on the UE assistance information.

The power saving mode may be at least one combination of transmission and reception related parameters.

The method may further include receiving, from the base station, a request for the UE assistance information through a higher layer signal or L1 signaling.

The UE assistance information may include information about a sleep mode time pattern preferred by the UE.

The method may further include receiving sleep mode pattern configuration information of the UE determined by the base station based on the information about the sleep mode time pattern preferred by the UE.

The sleep mode pattern configuration information may include at least one of periodicity information, duration information, and offset information of a sleep mode of the UE, periodicity information, duration information, and offset information of an active mode of the UE, information related to an uplink transmission parameter executed in the active mode, and information related to a downlink reception parameter executed in the active mode.

The UE assistance information may include downlink data buffer size information preferred by the UE.

The method may further include receiving a threshold value determined by the base station based on the downlink data buffer size information preferred by the UE.

The method may further include: receiving the downlink data buffer size information from the base station; comparing the buffer size information with the determined threshold value; and determining whether to operate in a sleep mode or an active mode, based on a result of the comparing.

At least one of performing physical downlink control channel (PDCCH) monitoring or receiving physical downlink shared channel semi-persistent scheduling (SPS PDSCH) may be performed in the active mode.

The UE assistance information may include cross-carrier scheduling information preferred by the UE.

The method may further include receiving cross-carrier scheduling configuration information determined by the base station, based on the UE assistance information, and the cross-carrier scheduling configuration information may configure at least one of a primary cell or a frequency range1 (FR1) cell as a scheduling cell.

The cross-carrier scheduling information preferred by the UE may include index information of a cell performing scheduling of at least one cell.

According to an embodiment of the present disclosure, a method, performed by a base station, of transmitting and receiving UE assistance information in a wireless communication system, may include: transmitting, to a UE, information about at least one power saving mode candidate set; receiving, from the UE, UE assistance information including information about a selected at least one power saving mode candidate; determining a power saving mode based on the UE assistance information; and performing communication with the UE based on the determined power saving mode.

The power saving mode may be at least one combination of transmission and reception related parameters.

According to an embodiment of the present disclosure, a UE for transmitting and receiving UE assistance information in a wireless communication system may include: a transceiver; and a processor connected to the transceiver and configured to receive, from a base station, information about at least one power saving mode candidate set, select at least one of the at least one power saving mode candidate set, transmit, to the base station, UE assistance information including information about the selected at least one power saving mode candidate, and perform communication with the base station based on a power saving mode determined by the base station based on the UE assistance information.

The power saving mode may be at least one combination of transmission and reception related parameters.

The processor may be further configured to receive, from the base station, a request for the UE assistance information through a higher layer signal or L1 signaling.

The UE assistance information may include information about a sleep mode time pattern preferred by the UE, and the processor may be further configured to receive sleep mode pattern configuration information of the UE determined by the base station based on the information about the sleep mode time pattern preferred by the UE.

The UE assistance information may include downlink data buffer size information preferred by the UE, and the processor may be further configured to receive a threshold value determined by the base station based on the downlink data buffer size information preferred by the UE.

The UE assistance information may include cross-carrier scheduling information preferred by the UE, the processor may be further configured to receive cross-carrier scheduling configuration information determined by the base station, based on the UE assistance information, and the cross-carrier scheduling configuration information may configure at least one of a primary cell or an FR1 cell as a scheduling cell.

According to an embodiment of the present disclosure, a base station for transmitting and receiving UE assistance information in a wireless communication system, may include: a transceiver; and a processor connected to the transceiver and configured to transmit, to a UE, information about at least one power saving mode candidate set, receive, from the UE, UE assistance information including information about a selected at least one power saving mode candidate, determine a power saving mode based on the UE assistance information, and perform communication with the UE based on the determined power saving mode.

The power saving mode may be at least one combination of transmission and reception related parameters.

MODE OF DISCLOSURE

Embodiments of the present disclosure will be described in detail with reference to the accompanying drawings.

In describing the embodiments, descriptions of technical contents that are well known in the technical field to which the present disclosure pertains and are not directly related to the present disclosure will be omitted. By omitting unnecessary descriptions, the gist of the present disclosure may be conveyed more clearly without being obscured.

For the same reason, some elements in the accompanying drawings are exaggerated, omitted, or schematically illustrated. Also, the size of each element does not entirely reflect the actual size. The same reference numerals are assigned to the same or corresponding elements in the drawings.

Effects and features of the present disclosure, and methods of achieving them will be clarified with reference to embodiments described below in detail with reference to the drawings. In this regard, the embodiments of the present disclosure may have different forms and should not be construed as being limited to the descriptions set forth herein. Rather, these embodiments are provided so that the present disclosure will be thorough and complete and will fully convey the concept of the embodiments of the present disclosure to those of ordinary skill in the art. The same reference numerals refer to the same elements throughout the specification. In describing the present disclosure, when the detailed description of the relevant functions or configurations is determined to unnecessarily obscure the gist of the present disclosure, the detailed description thereof may be omitted. The terms as used herein are those defined by taking into account functions in the present disclosure, but the terms may vary depending on the intention of users or those of ordinary skill in the art, precedents, or the like. Therefore, the definitions should be made based on the contents throughout the specification.

Hereinafter, a base station assigns resources to a terminal, and may include at least one of a gNode B, an eNode B, a Node B, a BS, a radio access unit, a base station controller, or a node on a network. Examples of a terminal may include a user equipment (UE), a mobile station (MS), a cellular phone, a smartphone, a computer, a multimedia system capable of performing a communication function, or the like. In the present disclosure, a downlink (DL) refers to a radio transmission path for a signal transmitted from the base station to the terminal, and an uplink (UL) refers to a radio transmission path for a signal transmitted from the terminal to the base station. Also, a long term evolution (LTE) or long term evolution-advanced (LTE-A) system will be described as an example, but the embodiments of the present disclosure may also be applied to other communication systems having a similar technical background or channel type. Examples thereof may include 5G mobile communication technologies (e.g., 5G, new radio (NR), etc.) developed after LTE-A. 5G may be a concept including existing LTE, LTE-A, and other similar services. Also, the present disclosure may be applicable to other communication systems through some modifications without departing from the scope of the present disclosure.

It will be understood that the respective blocks of flowcharts and combinations of the flowcharts may be performed by computer program instructions. Because these computer program instructions may be embedded in processors of general-purpose computers, special-purpose computers, or other programmable data processing apparatuses, the instructions executed through the processors of the computers or other programmable data processing apparatuses generate modules for performing the functions described in the flowchart block(s). Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s). Because the computer program instructions may also be embedded into the computers or other programmable data processing apparatuses, the instructions for executing the computers or other programmable data processing apparatuses by performing a series of operations on the computers or other programmable data processing apparatuses to generate a computer-executable process may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "module" or "-er/or" as used herein refers to a software element or a hardware element such as field programmable gate array (FPGA) or application specific integrated circuit (ASIC), and the "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module" or "-er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "modules" or "-ers/ors" may be combined with fewer elements and "modules" or "-ers/ors", or may be separated from additional elements and "modules" or "-ers/ors." Furthermore, the elements and the "modules" or "-ers/ors" may be implemented to reproduce one or more central processing units (CPUs) in the device or secure multimedia card. Also, in embodiments of the present disclosure, the "module" or "-er/or" may include one or more processors.

A wireless communication system has evolved from a system providing voice-oriented services to a broadband wireless communication system providing high speed high quality packet data services of communication standards such as high speed packet access (HSPA) of 3GPP, LTE or evolved universal terrestrial radio access (E-UTRA), LTE-A, LTE-Pro, high rate packet data (HRPD) of 3GPP2, ultra mobile broadband (UMB), and IEEE 802.16e.

In an LTE system as a representative example of a broadband wireless communication system, an orthogonal frequency division multiplexing (OFDM) scheme is employed in a downlink (DL), and a single carrier frequency division multiple access (SC-FDMA) scheme is employed in an uplink (UL). The UL refers to a radio link through which a terminal (UE or MS) transmits data or a control signal to a base station (eNode B or BS), and the DL refers to a radio link through which a base station transmits data or a control signal to a terminal. In the multiple access scheme as described above, data or control information of each user may be identified by performing assignment and operation so that time-frequency resources for carrying data or control information for each user do not overlap each other, that is, orthogonality therebetween is established.

Future communication systems after LTE, that is, 5G communication systems have to be able to freely reflect various requirements of users and service providers. Therefore, services that satisfy various requirements at the same time have to be supported. Services considered for 5G communication systems include enhanced mobile broadband (eMBB), massive machine type communication (MMTC), and ultra reliability low latency communication (URLLC).

eMBB aims to provide a data rate that is higher than that supported by LTE, LTE-A, or LTE-Pro. For example, in 5G communication systems, eMBB has to be able to provide a peak data rate of 20 Gbps in a DL and a peak data rate of 10 Gbps in an UL in terms of a single base station. Also, the 5G communication systems have to provide a peak data rate and simultaneously provide an increased user perceived data rate of the terminal. In order to satisfy such requirements, there is a need to improve various transmission and reception technologies including a more advanced multi-input multi-output (MIMO) transmission technology. Also, in a 2 GHz band used by LTE, signals are transmitted using up to 20 MHz transmission bandwidth. However, 5G communication systems use a frequency bandwidth wider than 20 MHz in 3 to 6 GHz frequency bands or 6 GHz or higher frequency bands. Therefore, the data rate required by 5G communication systems may be satisfied.

At the same time, mMTC is under consideration so as to support application services such as Internet of things (IoT) in 5G communication systems. In order to efficiently provide IoT, mMTC needs to support access of a massive terminal in a cell, improve coverage of the terminal, improve battery time, and reduce costs of the terminal. Because IoT is attached to various sensors and various devices to provide a communication function, IoT has to be able to support a large number of terminals (e.g., 1,000,000 terminals/km$^2$) in a cell. Also, due to the nature of the service, the terminal supporting mMTC is likely to be located in a shaded area that is not covered by the cell, such as the basement of a building. Therefore, wider coverage than other services provided by the 5G communication systems may be required. The terminal supporting mMTC has to be configured as an inexpensive terminal, and it is difficult to frequently replace a battery of the terminal. Therefore, a very long battery life time such as 10 to 15 years may be required.

Finally, URLLC is a cellular-based wireless communication service used for a specific purpose (mission-critical). URLLC may be used for services in remote control for robots or machinery, industrial automation, unmanned aerial vehicles, remote health care, emergency alerts, or the like. Therefore, communication provided by URLLC has to provide very low latency and very high reliability. For example, a service supporting URLLC has to satisfy air interface latency of less than 0.5 milliseconds and simultaneously has a packet error rate of 10$^{-5}$ or less. Therefore, for services supporting URLLC, the 5G systems have to provide a smaller transmit time interval (TTI) than other services and simultaneously require a design matter that has to allocate a wide resource in a frequency band so as to ensure reliability of a communication link.

The three services of 5G, that is, eMBB, URLLC, and mMTC, may be multiplexed and transmitted in a single system. In this case, different transmission and reception technologies and transmission and reception parameters may be used between services so as to satisfy different requirements of the respective services. Of course, 5G is not limited to the above-described three services.

Hereinafter, a method and apparatus for transmitting user equipment (UE) assistance information for reducing power consumption of a UE in a wireless communication system will be described.

According to an embodiment, in 5G, a message that provides transmission and reception related parameters preferred by a UE or arbitrary information necessary for the UE to transmit and receive transmission and reception related parameters preferred by the UE (collectively referred to as UE assistance information) may be transmitted to a base station. The base station may determine the transmission and reception parameters preferred by the UE based on the UE assistance information provided by the UE, may reflect the transmission and reception parameters preferred by the UE, and may configure or indicate the transmission and reception parameters preferred by the UE.

In the present disclosure, the UE may transmit information about "active time window" to the base station as a type of UE assistance information for reducing power consumption of the UE. The "active time window" may be defined as a series of time patterns in which the UE operates in an active mode. That is, the UE is activated only in a time domain corresponding to a set "active time window" to perform transmission and reception with the base station. The UE may operate in an inactive mode (or a sleep mode) in the remaining domains except for the time domain corresponding to the reported "active time window." The base station that has received information about the "active time window" configures and indicates transmission and reception related parameters based on active window configuration information reported by the UE. Therefore, the base station may perform transmission and reception with the UE only in the "active time window" and may not perform transmission and reception with the UE in the other times.

In the present disclosure, the base station may report a buffer state for DL data traffic to the UE. The UE may determine whether to monitor a DL control channel (physical downlink control channel (PDCCH)) based on the buffer state received from the base station. The UE may estimate the amount of current DL data traffic based on a buffer state report (BSR) received from the base station. The UE may monitor the DL control channel only when the amount of buffered traffic is greater than or equal to a specific threshold value. The UE may report information about the threshold value to the base station in the form of UE assistance information, and the base station may control the transmission of the DL control channel and the data channel based on the threshold value reported from the UE.

The power consumption of the UE may be reduced by reporting, to the base station, the UE assistance information of the UE proposed in the present disclosure and changing the transmission and reception configuration of the base station based on the corresponding information.

Hereinafter, a frame structure of a 5G system will be described in more detail with reference to the accompanying drawings.

FIG. 1 is a diagram illustrating a basic structure of a time-frequency domain that is a radio resource domain in which data or a control channel is transmitted in a 5G system, according to an embodiment of the present disclosure.

In FIG. 1, a horizontal axis represents a time domain and a vertical axis represents a frequency domain. A basic unit of resources in the time-frequency domain is a resource element (RE) 101 and may be defined as one orthogonal frequency division multiplexing (OFDM) symbol 102 on the time domain and one subcarrier 103 on the frequency domain. In the frequency domain, $N_{sc}^{RB}$ (e.g., 12) consecutive REs may constitute one resource block (RB) 104.

Figure 2:
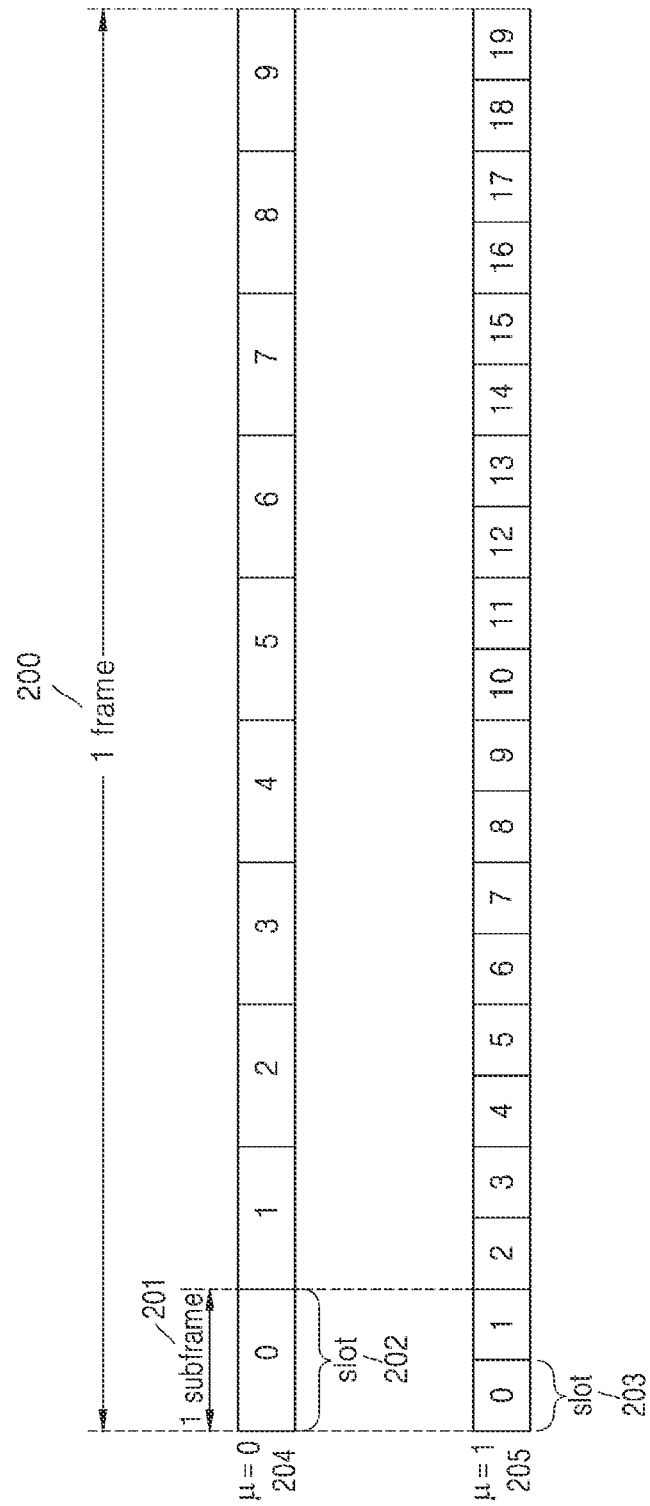
FIG. 2 is a diagram illustrating a frame, subframe, and slot structure in 5G, according to an embodiment of the present disclosure.

FIG. 2 is a diagram illustrating a slot structure considered in a 5G system, according to an embodiment of the present disclosure.

FIG. 2 illustrates an example of a structure of a frame 200, a subframe 201, and a slot 202. One frame 200 may be defined as 10 ms. One subframe 201 may be defined as 1 ms. Therefore, one frame 200 may include a total of 10 subframes 201. One slot 202 or 203 may be defined as 14 OFDM symbols (that is, the number $N_{symb}^{slot}$ of symbols per slot=14). One subframe 201 may include one or more slots 202 and 203, and the number of slots 202 and 203 per one subframe 201 may vary according to a set value μ (204, 205) for subcarrier spacing. In the example of FIG. 2, the case of μ=0 (204) and the case of μ=1 (205) are illustrated as subcarrier spacing setting values. When μ=0 (204), one subframe 201 may include one slot 202, and when μ=1 (205), one subframe 201 may include two slots 203. That is, the number $N_{slot}^{subframe,\mu}$ of slots per one subframe may vary according to the set value μ for the subcarrier spacing, and thus, the number $N_{slot}^{frame,\mu}$ of slots per one frame may vary. $N_{slot}^{subframe,\mu}$ and $N_{slot}^{frame,\mu}$ according to each subcarrier spacing setting value μ may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, downlink control information (DCI) in a 5G system will be described in detail.

In the 5G system, scheduling information about UL data (or physical uplink shared channel (PUSCH) or DL data (or physical downlink shared channel (PDSCH) is transmitted from the base station to the UE through DCI. The UE may monitor a fallback DCI format and a non-fallback DCI format with respect to the PUSCH or the PDSCH. The fallback DCI format may include a fixed field predefined between the base station and the UE, and the non-fallback DCI format may include a configurable field.

The DCI may be transmitted via a PDCCH through a channel coding and modulation process. A cyclic redundancy check (CRC) is attached to a DCI message payload. The CRC is scrambled by a radio network temporary identifier (RNTI) corresponding to the identity of the UE. Different RNTIs may be used according to the purpose of the DCI message, for example, UE-specific data transmission, a power control command, or a random access response. That is, the RNTI is not explicitly transmitted, but is transmitted by being included in a CRC calculation process. When the DCI message transmitted via the PDCCH is received, the UE checks the CRC by using the assigned RNTI. When a result of checking the CRC is correct, the UE may know that the DCI message has been transmitted to the UE.

For example, DCI that schedules a PDSCH for system information (SI) may be scrambled by an SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies transmit power control (TPC) may be scrambled by a TPC-RNTI. DCI that schedules a UE-specific PDSCH or PUSCH may be scrambled by a cell RNTI (C-RNTI).

DCI format 0_0 may be used as a fallback DCI that schedules a PUSCH. In this case, a CRC may be scrambled by a C-RNTI. DCI format 0_0 in which CRC is scrambled by the C-RNTI may include, for example, the following information.

TABLE 2

Identifier for DCI formats - [1] bit
Frequency domain resource
assignment -[⌈$\log_2(N_{RB}^{UL, BWP}(N_{RB}^{UL, BWP} + 1)/2)$⌉] bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled RUSCH - [2] bits
UL/SUL indicator - 0 or 1 bit DCI format 0_1 may be used as a non-fallback DCI that schedules a PUSCH. In this case, a CRC may be scrambled by a C-RNTI. DCI format 0_1 in which CRC is scrambled by the C-RNTI may include, for example, the following information.

TABLE 3

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
  For resource allocation type 0, ⌈$N_{RB}^{UL,BWP}/P$⌉ bits
  For resource allocation type 1, ⌈$\log_2(N_{RB}^{UL,BWP}(N_{RB}^{UL,BWP} + 1)/2)$⌉ bits
Time domain resource assignment - 1, 2, 3, or 4 bits
VRB-to-PRB mapping - 0 or 1 bit, only for resource allocation type 1.
  0 bit if only resource allocation type 0 is configured;
  1 bit otherwise.
Frequency hopping flag - 0 or 1 bit, only for resource allocation type 1.
  0 bit if only resource allocation type 0 is configured;
  1 bit otherwise.
Modulation and coding scheme - 5 bits
New data indicator - 1 bit
Redundancy version - 2 bits
HARQ process number - 4 bits
1st downlink assignment index - 1 or 2 bits
  1 bit for semi-static HARQ-ACK codebook;
  2 bits for dynamic HARQ-ACK codebook with single HARQ-ACK codebook.
2nd downlink assignment index - 0 or 2 bits
  2 bits for dynamic HARQ-ACK codebook with two HARQ-ACK sub-codebooks;
  0 bit otherwise.
TPC command for scheduled PUSCH - 2 bits SRS resource indicator - $\left\lceil \log_2\left(\sum_{k=1}^{L_{max}} \binom{N_{SRS}}{k}\right) \right\rceil$ or ⌈$\log_2(N_{SRS})$⌉ bits TABLE 3-continued $\lceil \log_2(\sum_{k=1}^{L_{max}} \binom{N_{SRS}}{k}) \rceil$ bits for non-codebook based PUSCH transmission;
$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used as a fallback DCI that schedules a PDSCH. In this case, a CRC may be scrambled by a C-RNTI. DCI format 1_0 in which CRC is scrambled by the C-RNTI may include, for example, the following information.

TABLE 4

Identifier for DCI formats - [1] bit
Frequency domain resource assignment -$\lceil \log_2(N_{RB}^{DL, BWP}(N_{RB}^{DL, BWP}+1)/2) \rceil$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits DCI format 1_1 may be used as a non-fallback DCI that schedules a PDSCH. In this case, a CRC may be scrambled by a C-RNTI. DCI format 1_1 in which CRC is scrambled by the C-RNTI may include, for example, the following information.

TABLE 5

Carrier indicator - 0 or 3 bits
Identifier for DCI formats - [1] bits
Bandwidth part indicator - 0, 1 or 2 bits
Frequency domain resource assignment
For resource allocation type 0, $\lceil \log_2(N_{RB}^{DL, BWP}/P) \rceil$ bits
For resource allocation type 1, $\lceil \log_2(N_{RB}^{DL, BWP}(N_{RB}^{DL, BWP}+1)/2) \rceil$ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits TABLE 5-continued CBG flushing out information - 0 or 1 bit
DMRS sequence initialization - 1 bit Hereinafter, a method of configuring a bandwidth part considered in a 5G communication system will be described.

Figure 3:
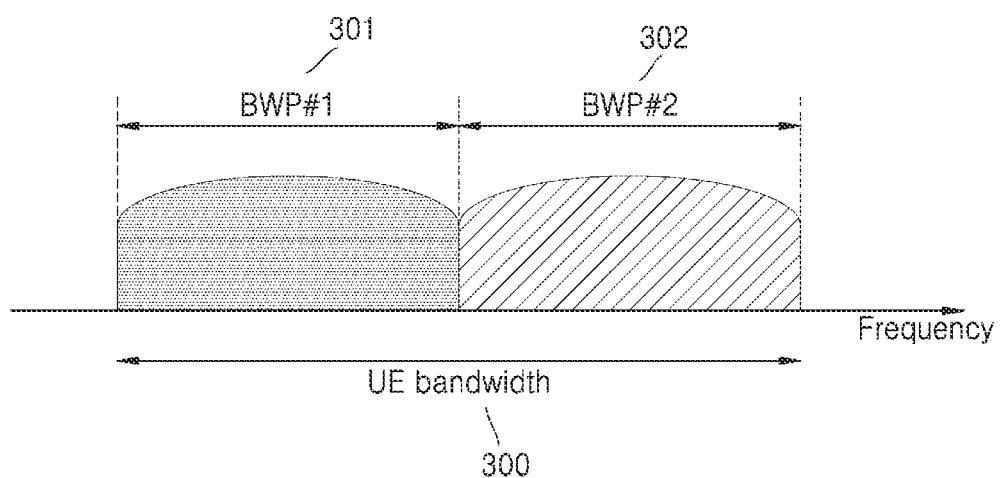
FIG. 3 is a diagram illustrating an example of a bandwidth part configuration in 5G, according to an embodiment of the present disclosure.

FIG. 3 is a diagram illustrating an example of a bandwidth part configuration in a 5G communication system, according to an embodiment of the present disclosure. FIG. 3 illustrates an example in which a UE bandwidth 300 is configured as two bandwidth parts, that is, bandwidth part #1 (BWP #1) 301 and bandwidth part #2 (BWP #2) 302. The base station may configure one or more bandwidth parts to the UE, and may configure the following information for each bandwidth part.

TABLE 6

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

Of course, the present disclosure is not limited to the above example. In addition to the above-described configuration information, various parameters related to the bandwidth parts may be set in the UE. The base station may transmit the information to the UE through higher layer signaling, for example, radio resource control (RRC) signaling. At least one bandwidth part among the configured one or more bandwidth parts may be activated. Whether to activate the configured bandwidth part may be semi-statically transmitted from the base station to the UE through RRC signaling, or may be dynamically transmitted from the base station to the UE through MAC CE or DCI.

The configuration of the bandwidth part supported by the 5G may be used for various purposes.

According to an embodiment, when the bandwidth supported by the UE is less than the system bandwidth, this may be supported by configuring the bandwidth part. For example, the base station configures a frequency position (configuration information 2) of the bandwidth part in [Table 4] to the terminal, so that the UE may transmit and receive data at a specific frequency position within the system bandwidth.

Also, according to an embodiment, the base station may configure a plurality of bandwidth parts to the UE for the purpose of supporting different numerologies. For example, in order to support, to a certain UE, data transmission and reception using both a subcarrier spacing of 15 kHz and a subcarrier spacing of 30 kHz, two bandwidth parts may be configured with a subcarrier spacing of 15 kHz and 30 kHz, respectively. Different bandwidth parts may be frequency-division-multiplexed. When data is transmitted and received at specific subcarrier spacing, the bandwidth part configured with the corresponding subcarrier spacing may be activated.

Also, according to an embodiment, for the purpose of reducing power consumption of the UE, the base station may configure bandwidth parts having different magnitudes of bandwidths to the UE. For example, when the UE supports a very large bandwidth, for example, a bandwidth of 100 MHz, and always transmits and receives data in the corresponding bandwidth, very high power consumption may occur. In particular, monitoring an unnecessary DL control channel with a large bandwidth of 100 MHz in a situation in which traffic is absent may be very inefficient in terms of power consumption. In order to reduce power consumption of the UE, the base station may configure, to the UE, a bandwidth part of a relatively small bandwidth, for example, a bandwidth part of 20 MHz. In a situation in which traffic is absent, the UE may perform the monitoring operation in the 20 MHz bandwidth part, and when data is generated, the UE may transmit and receive data in a bandwidth part of 100 MHz according to an indication of the base station.

In the method of configuring the bandwidth part, the UEs before RRC connection may receive configuration information about an initial bandwidth part through a master information block (MIB) in an initial access phase. More specifically, the UE may be configured with a control resource set (CORESET) for a DL control channel through which downlink control information (DCI) for scheduling a system information block (SIB) may be transmitted from an MIB of a physical broadcast channel (PBCH). The bandwidth of the control resource set configured by MIB may be regarded as the initial bandwidth part, and the UE may receive the PDSCH, through which the SIB is transmitted, via the configured initial bandwidth part. In addition to the purpose of receiving the SIB, the initial bandwidth part may be utilized for other system information (OSI), paging, and random access.

Hereinafter, a downlink control channel in a 5G communication system will be described in more detail with reference to the accompanying drawings.

Figure 4:
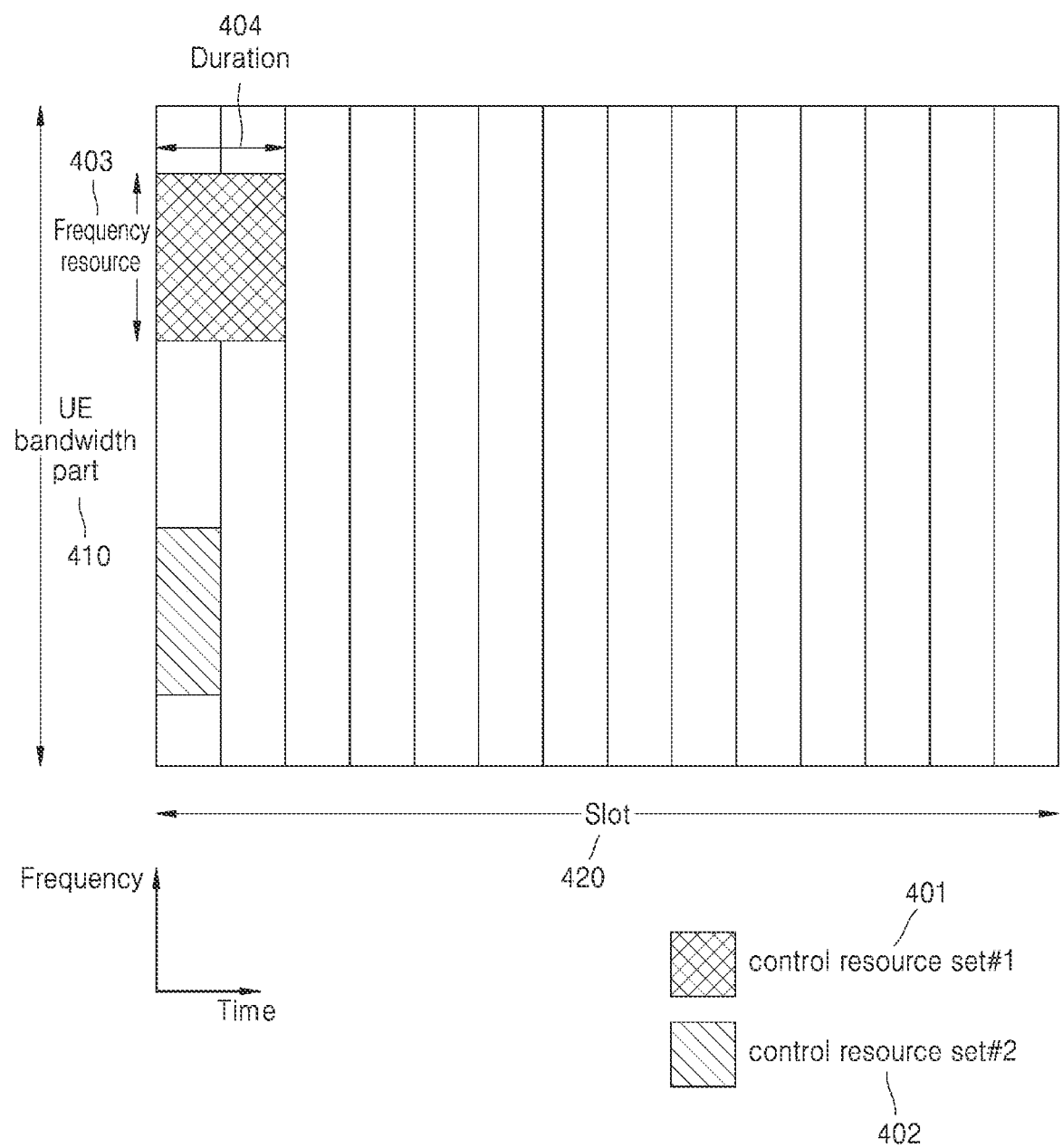
FIG. 4 is a diagram illustrating an example of a control resource set configuration of a downlink control channel in 5G, according to an embodiment of the present disclosure.

FIG. 4 is a diagram illustrating an example of a control resource set (CORESET) in which a downlink control channel is transmitted in a 5G wireless communication system, according to an embodiment of the present disclosure. FIG. 4 illustrates an example in which a UE bandwidth part 410 is configured on a frequency domain and two control resource sets (control resource set #1 401 and control resource set #2 402) are configured in one slot 420 on a time domain. The control resource sets 401 and 402 may be configured to a specific frequency resource 403 within the entire UE bandwidth part 410 on the frequency domain. One or more OFDM symbols may be configured on the time domain and may be defined as a control resource set duration 404. In the example of FIG. 4, the control resource set #1 401 is configured with a control resource set duration of two symbols, and the control resource set #2 402 is configured with a control resource set duration of one symbol.

The base station may configure the control resource set of the 5G to the UE through higher layer signaling (e.g., SI, MIB, or RRC signaling). Configuring the control resource set to the UE may mean providing information such as a control resource set identity, a frequency position of the control resource set, a symbol duration of the control resource set, and the like. For example, the following information may be included.

TABLE 7

```
ControlResourceSet ::=            SEQUENCE {
    -- Corresponds to L1 parameter 'CORESET-ID'
    controlResourceSetId            ,
    (Control resource set identity))
        frequencyDomainResources    BIT STRING (SIZE
(45)),
    (Frequency domain resource allocation information)
        duration
        INTEGER (1..maxCoReSetDuration),
    (Time domain resource allocation information)
        cce-REG-MappingType
```

TABLE 7-continued

```
    CHOICE {
    (CCE-to-REG mapping type)
        interleaved
        SEQUENCE {
            reg-BundleSize
        ENUMERATED {n2, n3, n6},
        (REG bundle size)
            precoderGranularity
        ENUMERATED {sameAsREG-bundle, allContiguousRBs},
            interleaverSize
        ENUMERATED {n2, n3, n6}
            (Interleaver size)
            shiftIndex
        INTEGER(0..maxNrofPhysicalResourceBlocks-1)
            OPTIONAL
            (Interleaver shift))
    },
    nonInterleaved                       NULL
    },
    tci-StatesPDCCH
        SEQUENCE(SIZE (1..maxNrofTCI-StatesPDCCH)) OF TCI-StateId
            OPTIONAL,
    (QCL configuration information)
        tci-PresentInDCI                 ENUMERATED
{enabled}
            OPTIONAL,  -- Need S
}
```

Figure 5:
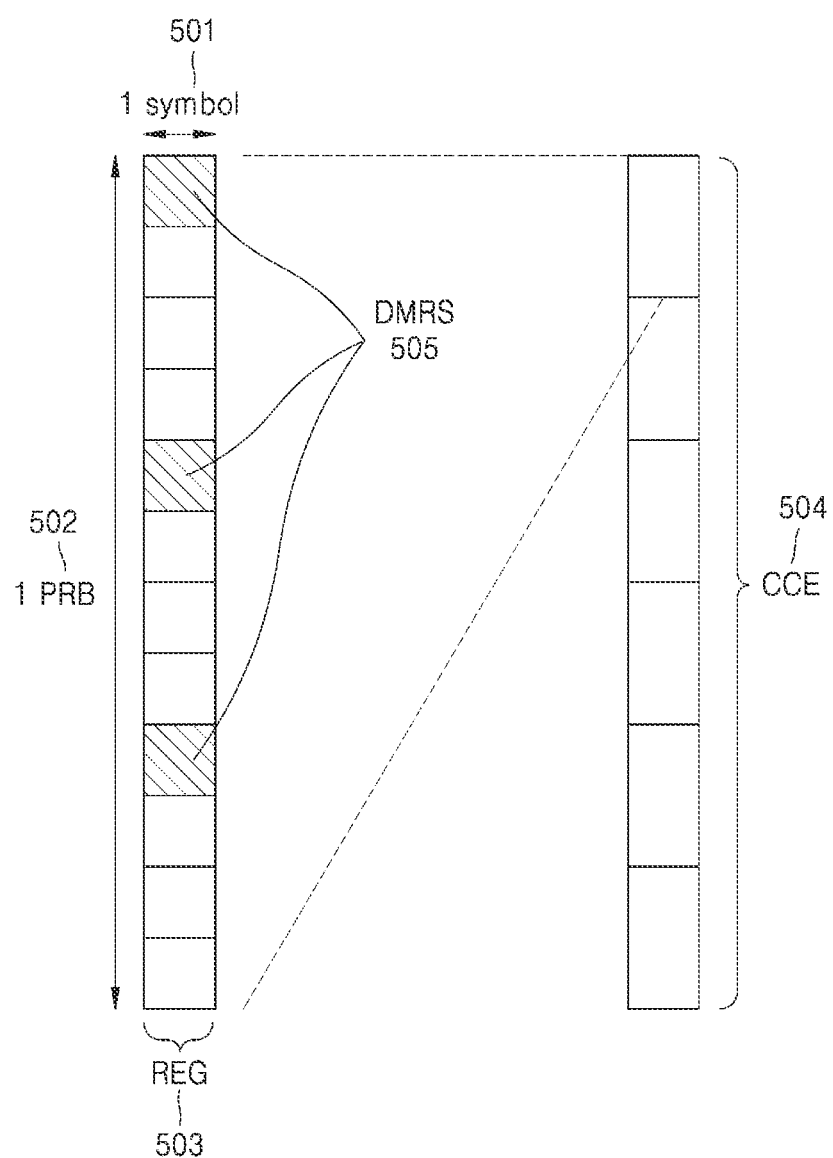
FIG. 5 is a diagram illustrating a downlink control channel structure in 5G, according to an embodiment of the present disclosure.

FIG. 5 is a diagram illustrating an example of a basic unit of time and frequency resources constituting a downlink control channel that is usable in 5G, according to an embodiment of the present disclosure. Referring to FIG. 5, the basic unit of the time and frequency resources constituting the control channel may be referred to as a resource element group (REG) 503. The REG 503 may be defined as one OFDM symbol 501 on a time domain and one physical resource block (PRB) 502, that is, 12 subcarriers, on a frequency domain. The base station may configure a downlink control channel assignment unit by concatenating the REG 503.

As illustrated in FIG. 5, when the basic unit to which the downlink control channel is assigned in 5G is a control channel element (CCE) 504, one CCE 504 may include a plurality of REGs 503. In the example illustrated in FIG. 5, when the REG 503 includes 12 REs and one CCE 504 includes 6 REGs 503, one CCE 504 may include 72 REs. When the downlink control resource set is configured, the downlink control resource set may include a plurality of CCEs 504. A specific downlink control channel may be transmitted by being mapped to one or more CCEs 504 according to an aggregation level (AL) in the control resource set. The CCEs 504 in the control resource set may be identified by numbers. In this case, the numbers may be assigned to the CCEs 504 according to a logical mapping scheme.

The basic unit of the downlink control channel illustrated in FIG. 5, that is, the REG 503, may include both of REs to which the DCI is mapped and regions to which a demodulation reference signal (DMRS) 505, which is a reference signal for decoding the same, is mapped. As illustrated in FIG. 5, three DMRSs 505 may be transmitted in one REG 503.

The number of CCEs required to transmit the PDCCH may be 1, 2, 4, 8, or 16 according to the AL, and a different number of CCEs may be used to implement link adaptation of the downlink control channel. For example, when AL=L, one downlink control channel may be transmitted through L CCEs. The UE has to detect a signal in a state in which the UE does not know information about the downlink control channel. A search space representing a set of CCEs may be used for blind decoding. The search space is a set of downlink control channel candidates including CCEs that the UE has to attempt to decode on a given AL. Because there are various ALs that make 1, 2, 4, 8, or 16 CCEs into one bundle, the UE may have a plurality of search spaces. The search space set may be defined as a set of search spaces at all set ALs.

The search space may be classified into a common search space and a UE-specific search space. A certain group of UEs or all the UEs may detect the common search space of the PDCCH in order to receive cell-common control information such as a paging message or dynamic scheduling for system information. For example, PDSCH scheduling allocation information for transmission of SIB including cell operator information and the like may be received by detecting the common search space of the PDCCH. The common search space may be defined as a set of previously appointed CCEs because a certain group of UEs or all the UEs have to receive the PDCCH. The UE may receive the UE-specific PDSCH or PUSCH scheduling allocation information by detecting the UE-specific search space of the PDCCH. The UE-specific search space is a function of the UE identity and various system parameters, and may be defined in a UE-specific manner.

In 5G, a parameter for the search space of the PDCCH may be configured from the base station to the UE by higher layer signaling (e.g., SIB, MIB, RRC signaling, etc.). For example, the base station may set, to the UE, the number of PDCCH candidates at each AL L, a monitoring periodicity for the search space, monitoring occasion of symbol units in the slot for the search space, a search space type (common search space or UE-specific search space), a combination of RNTI and DCI format to be monitored in the search space, a control resource set index for monitoring the search space, etc. For example, the following information may be included.

TABLE 8

```
SearchSpace ::=                                    SEQUENCE {
    -- Identity of the search space. SearchSpaceId = 0 Identifies the
SearchSpace configured via PBCH (MIB) or ServingCellConfigCommon.
    searchSpaceId
    SearchSpaceId,
    (Search space identity)
        controlResourceSetId                       ControlResourceSetId,
    (Control resource set identity)
        monitoringSlotPeriodicityAndOffset         CHOICE {
    (Monitoring slot periodicity)
        sl1
        NULL,
        sl2
        INTEGER (0..1),
        sl4
        INTEGER (0..3),
        sl5
        INTEGER (0..4),
        sl8
        INTEGER (0..7),
        sl10
        INTEGER (0..9),
        sl16
        INTEGER (0..15),
        sl20
        INTEGER (0..19)
    }
                                                   OPTIONAL,
    monitoringSymbolsWithinSlot                    BIT STRING
(SIZE (14))
        OPTIONAL,
    (Monitoring symbols within slot)
        nrofCandidates
        SEQUENCE {
```

TABLE 8-continued

```
(Number of PDCCH candidates per aggregation level)
    aggregationLevel1
    ENUMERATED {n0, n1, n2, n3, n4, n5, n6, n8},
    aggregationLevel2
    ENUMERATED {n0, n1, n2, n3, n4, n5, n6, n8},
    aggregationLevel4
    ENUMERATED {n0, n1, n2, n3, n4, n5, n6, n8},
    aggregationLevel8
    ENUMERATED {n0, n1, n2, n3, n4, n5, n6, n8},
    aggregationLevel16
    ENUMERATED {n0, n1, n2, n3, n4, n5, n6, n8}
    },
    searchSpaceType                                CHOICE
{
    (Search space type)
        -- Configures this search space as common search space (CSS) and
DCS formats to monitor.
        common
        SEQUENCE {
        (Common search space)
        }
        ue-Specific
        SEQUENCE {
        (UE-specific search space)
        -- Indicates whether the UE monitors in this USS for DCI
formats 0-0 and 1-0 or for formats 0-1 and 1-1.
        formats
        ENUMERATED {formats0-0-And-1-0, formats0-1-And-1-1},
        ...
}
```

The base station may configure one or more search space sets to the UE according to configuration information. According to some embodiments, the base station may configure search space set 1 and search space set 2 to the UE, may configure DCI format A scrambled by an X-RNTI in the search space set 1 to be monitored in the common search space, and may configure DCI format B scrambled by a Y-RNTI in the search space set 2 to be monitored in the UE-specific search space.

According to the configuration information, one or more search space sets may exist in the common search space or the UE-specific search space. For example, search space set #1 and search space set #2 may be configured as the common search space, and search space set #3 and search space set #4 may be configured as the UE-specific search space.

The combination of the following DCI format and RNTI may be monitored in the common search space. Of course, the present disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI The combination of the following DCI format and RNTI may be monitored in the UE-specific search space. Of course, the present disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs specified above may follow the following definitions and usages.

C-RNTI (Cell RNTI): For UE-specific PDSCH scheduling

TC-RNTI (Temporary Cell RNTI): For UE-specific PDSCH scheduling

CS-RNTI (Configured Scheduling RNTI): For semi-statically configured UE-specific PDSCH scheduling RA-RNTI (Random Access RNTI): For PDSCH scheduling in random access phase P-RNTI (Paging RNTI): For PDSCH scheduling for paging transmission SI-RNTI (System Information RNTI): For PDSCH scheduling for transmitting system information INT-RNTI (Interruption RNTI): For notifying whether PDSCH is punctured TPC-PUSCH-RNTI (Transmit Power Control for PUSCH RNTI): For indicating power control command for PUSCH TPC-PUCCH-RNTI (Transmit Power Control for PUCCH RNTI): For indicating power control command for PUCCH TPC-SRS-RNTI (Transmit Power Control for SRS RNTI): For indicating power control command for SRS The DCI formats specified above may follow the following definitions.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the AL L in the control resource set p and the search space set s may be represented by the following equation.

$$\left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p} / L \rfloor \right\} + i \quad \text{[Equation 1]}$$

L: Aggregation level $n_{CI}$: Carrier index $N_{CCE,p}$: Total number of CCEs existing within control resource set p $n_{s,f}^\mu$: Slot index $M_{p,s,max}^{(L)}$: Number of PDCCH candidate groups of aggregation level L $m_{s n_{CI}} = 0, \ldots, M_{p,s,max}^{(L)} - 1$: PDCCH candidate group index of aggregation level L i=0, ..., L−1

$Y_{p,n_{s,f}^\mu} = (A_p \cdot Y_{p,n_{s,f}^\mu - 1}) \mod D$, $Y_{p,-1} = n_{RNTI} \neq 0$, $A_0 = 39827$, $A_1 = 39829$, $A_2 = 39839$, $D = 65537$ $n_{RNTI}$: UE IE The $Y\_(p, n_{s,f}^\mu)$ value may correspond to 0 in the case of the common search space.

The $Y\_(p, n_{s,f}^\mu)$ value may correspond to a value that changes according to the UE identity (C-RNTI or ID that the base station sets for the UE) and the time index in the case of the UE-specific search space.

Hereinafter, an uplink control channel (physical uplink control channel (PUCCH)) in a 5G communication system will be described in more detail with reference to the accompanying drawings.

Figure 6:
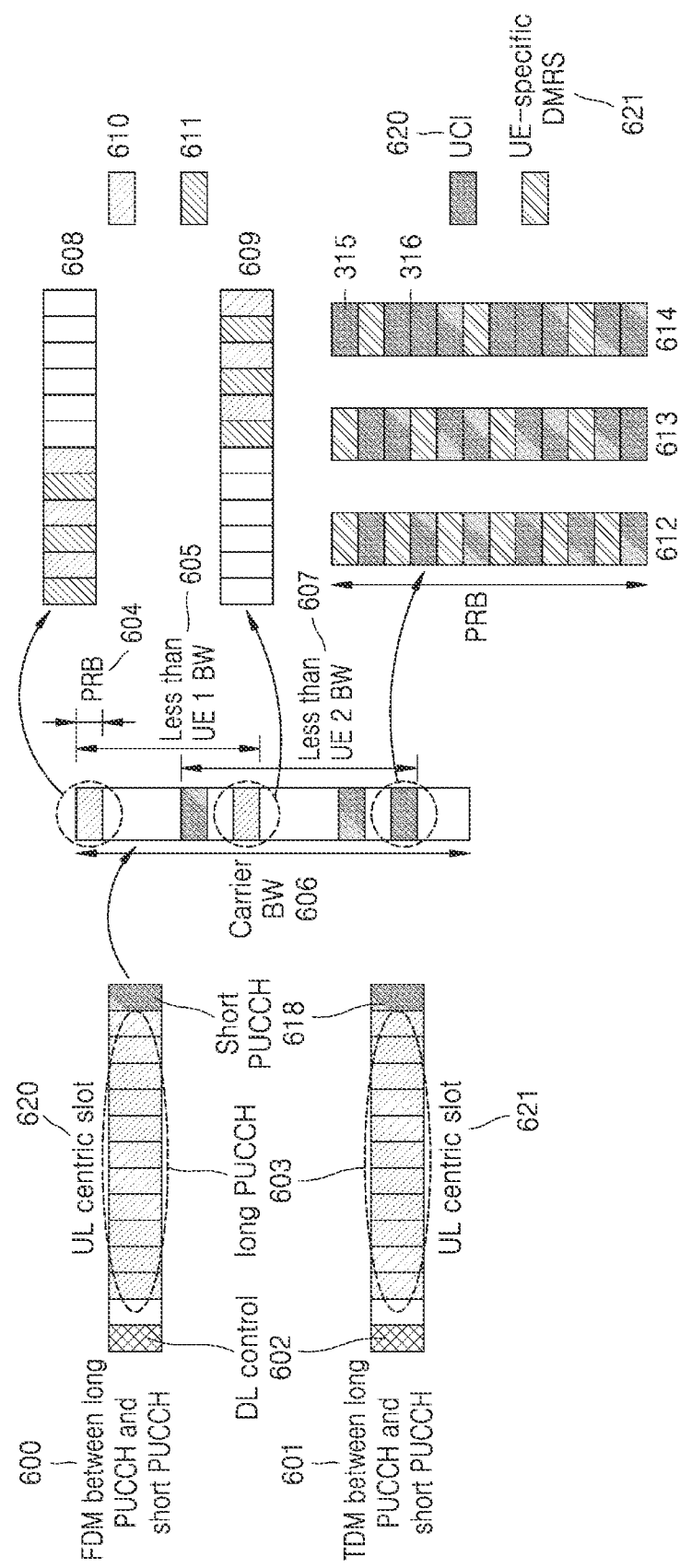
FIG. 6 is a diagram illustrating an uplink control channel structure in 5G, according to an embodiment of the present disclosure.

FIG. 6 is a diagram schematically illustrating the structure of the uplink control channel, according to an embodiment of the present disclosure.

In FIG. 6, a long PUCCH 603 and a short PUCCH 618 are multiplexed in a frequency domain (FDM, 600) or multiplexed in a time domain (TDM, 601). First, a slot structure in which the long PUCCH 603 and the short PUCCH 618 are multiplexed will be described with reference to FIG. 6. 620 and 621 of FIG. 6 indicate UL centric slots in which the uplink is mainly used in the slot that is the basic transmission unit of 5G (The slot is referred to as several names such as a subframe or TTI. In the present disclosure, the basic transmission unit is referred to as the slot.). In the uplink centric slots 620 and 621, most OFDM symbols may be used as an uplink, the entire OFDM symbols may be used for uplink transmission, or some OFDM symbols in the front may be used for downlink transmission. When the downlink and the uplink simultaneously exist in one slot, a transmission gap may exist therebetween. Of course, the present disclosure is not limited to the above example. In FIG. 6, the first OFDM symbol in one slot is used for downlink transmission, for example, downlink control channel transmission 602, and the third and subsequent OFDM symbols are used for uplink transmission. The second OFDM symbol is used as a transmission gap. In the uplink transmission, uplink data channel transmission and uplink control channel transmission are possible.

Next, the long PUCCH 603 will be described.

Because a control channel with a long transmission interval is used for extending cell coverage, the transmission may be performed by using a discrete Fourier transform spread OFDM (DFT-S-OFDM) scheme, which is a shorter carrier transmission rather than an OFDM transmission. Therefore, in this case, the transmission has to be performed by using only consecutive subcarriers. Also, in order to obtain a frequency diversity effect, an uplink control channel with a long transmission interval is configured at a distant location as in 608 and 609. A distance 605 in terms of frequency has to be less than the bandwidth supported by the UE. In the front part of the slot, the transmission is performed by using PRB-1 as in 608, and in the rear part of the slot, the transmission has to be performed by using PRB-2 as in 609. A physical resource block (PRB) is a physical resource block. The PRB means a minimum transmission unit on the frequency side and may be defined as 12 subcarriers or the like. Therefore, a frequency-side distance between PRB-1 and PRB-2 has to be less than the maximum bandwidth supported by the UE, and the maximum bandwidth supported by the UE may be less than or equal to a bandwidth 606 supported by the system. The frequency resources PRB-1 and PRB-2 may be configured to the UE by a higher signal, the frequency resources may be mapped to a bit field by the higher signal, and which frequency resource is to be used may be indicated to the UE by a bit field included in the downlink control channel. Also, it is assumed that the control channel transmitted in the front part of the slot of 608 and the control channel transmitted in the rear part of the slot of 609 each include uplink control information (UCI) of 610 and a UE reference signal 611, and the two signals are temporally separated and transmitted in different OFDM symbols.

The long PUCCH 603 supports transmission formats such as PUCCH format 1, PUCCH format 3, or PUCCH format 4 according to the number of supportable control information bits and whether UE multiplexing is supported through Pre-DFT OCC support in a front stage of inverse fast Fourier transform (IFFT). First, PUCCH format 1 is a DFT-S-OFDM-based long PUCCH format capable of supporting up to 2 bits of control information. The control information may include each or a combination of HARQ-ACK and scheduling request (SR). In PUCCH format 1, an OFDM symbol including a DMRS that is a demodulation reference signal and an OFDM symbol including UCI are repeatedly configured. When the number of transmission symbols of PUCCH format 1 is eight symbols, the eight symbols include a DMRS symbol, a UCI symbol, a DMRS symbol, a UCI symbol, a DMRS symbol, a UCI symbol, a DMRS symbol, and a UCI symbol in sequence from the first start symbol. The DMRS symbol has a structure in which a sequence corresponding to a length of one RB on the frequency domain is spread by using an orthogonal code (or an orthogonal sequence or spreading code w_i(m)) on the time domain within one OFDM symbol and is transmitted after IFFT is performed thereon. The UCI symbol has a structure in which d(0) is generated by performing BPSK modulation 1-bit control information and QPSK modulation on 2-bit control information, scrambling is performed by multiplying the generated d(0) by a sequence corresponding to a length of 1 RB on the frequency domain, and the scrambled sequence is spread by using an orthogonal code (or an orthogonal sequence or spreading code w_i(m)) on the time domain and is transmitted after IFFT is performed thereon. The UE generates a sequence based on the set ID and group hopping or sequence hopping configuration set by the higher signal from the base station, and generates a sequence corresponding to a length of 1 RB by cyclic-shifting the generated sequence with an indicated initial cyclic shift (CS) value.

w_i(m) is given according to the length $N_{SF}$ of the spreading code as follows. i represents the index of the spreading code itself, and m represents the indices of elements of the spreading code. The numbers in [ ] in the table represent φ(m). For example, when the length of the spreading code is 2, the spreading code w_i(m) becomes $$w_i(0) = e^{j\frac{2\pi \cdot 0}{N_{SF}}} = 1 \text{ and } w_i(1) = e^{j\frac{2\pi \cdot 0}{N_{SF}}} = 1,$$

and thus, w_i(m)=[1 1].

Next, PUCCH format 3 is a long PUCCH format based on DFT-S-OFDM capable of supporting more than 2 bits of control information. The control information may include each or a combination of HARQ-ACK, channel state information (CSI), and SR. In PUCCH format 3, DMRS symbol positions are presented in the following table according to whether frequency hopping is performed and whether additional DMRS symbols are configured.

TABLE 11

| | DMRS position within PUCCH format 3/4 transmission | | | |
|---|---|---|---|---|
| | Additional DMRS configuration not configured | | Additional DMRS configuration configured | |
| PUCCH format 3/4 transmission duration | Frequency hopping not configured | Frequency hopping configured | Frequency hopping not configured | Frequency hopping configured |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

For example, when the number of transmission symbols of PUCCH format 3 is eight, the DMRS is transmitted to the first symbol and the fifth symbol, while starting the first start symbol of the eight symbols with 0. The table is also applied to the DMRS symbol positions of PUCCH format 4 in the same manner.

Next, PUCCH format 4 is a long PUCCH format based on DFT-S-OFDM capable of supporting more than 2 bits of control information. The control information may include each or a combination of HARQ-ACK, channel state information (CSI), and SR. PUCCH format 4 differs from PUCCH format 3 in that, in the case of PUCCH format 4, PUCCH format 4 of multiple UEs may be multiplexed within one RB. PUCCH format 4 of multiple UEs may be multiplexed by applying Pre-DFT OCC to control information at the front stage of the IFFT. The number of transmittable control information symbols of one UE is reduced according to the number of multiplexed UEs.

Next, the short PUCCH 618 will be described. The short PUCCH 618 may be transmitted in both the downlink centric slot and the uplink centric slot. In general, the short PUCCH 618 is transmitted in the last symbol of the slot or

TABLE 10

Spreading code for PUCCH format 1 $w_i(m) = e^{j2\pi\phi(m)/N_{SF}}$

| | φ | | | | | | |
|---|---|---|---|---|---|---|---|
| $N_{SF}$ | i = 0 | i = 1 | i = 2 | i = 3 | i = 4 | i = 5 | i = 6 |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] | the OFDM symbol at the rear (e.g., the last OFDM symbol or the second last OFDM symbol, or the last two OFDM symbols). Of course, the short PUCCH 618 may be transmitted at any position within the slot. The short PUCCH may be transmitted by using one OFDM symbol, two OFDM symbols, or a plurality of OFDM symbols. In FIG. 6, the short PUCCH is transmitted in the last symbol 618 of the slot. Radio resources for the short PUCCH 618 are allocated in units of PRBs on the frequency side. One PRB or a plurality of consecutive PRBs may be allocated, or a plurality of PRBs spaced apart in a frequency band may be allocated. The allocated PRBs have to be included in a band identical to or less than a frequency band 607 supported by the UE. The PRBs, which are the allocated frequency resources, may be configured to the UE by a higher signal, the frequency resources may be mapped to a bit field by the higher signal, and which frequency resource is to be used may be indicated to the UE by a bit field included in the downlink control channel. In one PRB, the uplink control information 620 and the demodulation reference signal 621 may be multiplexed in the frequency band. For example, a method of transmitting a demodulation reference signal on one subcarrier for every two symbols as in 612 illustrated in FIG. 6, a method of transmitting a demodulation reference signal on one subcarrier for every three symbols as in 613, a method of transmitting a demodulation reference signal on one subcarrier for every four symbols as in 614, or the like may exist. In the method 612, 613, and 614 of transmitting the demodulation signal in FIG. 6, which method is to be used may be set by the higher signal. Alternatively, one of the mapping schemes is defined in the standard, so that the UE may transmit the short PUCCH according to the mapping scheme and the base station may demodulate the short PUCCH according to the mapping scheme. Alternatively, the UE multiplexes the demodulation reference signal and the uplink control information according to the method indicated through reception of the higher signal and transmits the multiplexed demodulation reference signal and uplink control information. Also, according to an embodiment, the method of transmitting the demodulation reference signal may be determined according to the number of bits of the uplink control information 620. When the number of bits of uplink control information is small, the UE may perform transmission by multiplexing the demodulation reference signal and the uplink control information as in 612. When the number of bits of uplink control information is small, a sufficient transmission code rate may be obtained even though many resources are not used for transmission of the uplink control information. When the number of bits of uplink control information is large, the UE may perform transmission by multiplexing the demodulation reference signal and the uplink control information as in 614. When the number of bits of uplink control information is large, it is necessary to use many resources for transmission of the uplink control information in order to lower a transmission code rate.

The short PUCCH 618 supports transmission formats such as PUCCH format 0 and PUCCH format 2 according to the number of supportable bits of control information. First, PUCCH format 0 is a cyclic prefix (CP)-OFDM-based short PUCCH format capable of supporting up to 2 bits of control information. The control information may include each or a combination of HARQ-ACK and SR. PUCCH format 0 has a structure in which DMRS is not transmitted and only a sequence mapped to 12 subcarriers is transmitted on the frequency domain within one OFDM symbol. The UE generates a sequence based on the set ID and group hopping or sequence hopping configuration set by the higher signal from the base station, cyclic-shifts the generated sequence with a final CS obtained by adding a CS value according to ACK or NACK to an indicated initial CS value, maps the sequence to 12 subcarriers, and transmits the mapped sequence. In the case in which HARQ-ACK is 1 bit, when HARQ-ACK is ACK as shown in the following table, 6 is added to the initial CS value to generate the final CS, and when HARQ-ACK is NACK, 0 is added to the initial CS to generate the final CS. 0 that is the CS value for NACK and 6 that is the CS value for ACK are defined in the standard, and the UE always generates PUCCH format 0 according to the above value and transmits 1-bit HARQ-ACK.

TABLE 12

| 1-Bit HARQ-ACK | NACK | ACK |
| --- | --- | --- |
| Final CS | (Initial CS + 0) mod 12 = Initial CS | (Initial CS + 6) mod 12 |

As in the following table, in the case in which HARQ-ACK is 2 bits, 0 is added to the initial CS value when (NACK, NACK), 3 is added to the initial CS value when (NACK, ACK), 6 is added to the initial CS value when (ACK, ACK), and 9 is added to the initial CS value when (ACK, NACK). 0 that is the CS value for (NACK, NACK), 3 that is the CS value for (NACK, ACK), 6 that is the CS value for (ACK, ACK), and 9 that is the CS value for (ACK, NACK) are defined in the standard, and the UE always generates PUCCH format 0 according to the above value and transmits 2-bit HARQ-ACK.

When the final CS value is greater than 12 by the CS value added to the initial CS value according to ACK or NACK, the length of the sequence is 12. Therefore, it is obvious to apply modulo 12.

TABLE 13

| 2-Bit HARQ-ACK | NACK, NACK | NACK, ACK | ACK, ACK | ACK, NACK |
| --- | --- | --- | --- | --- |
| Final CS | (Initial CS + 0) mod 12 = Initial CS | (Initial CS + 3) mod 12 | (Initial CS + 6) mod 12 | (Initial CS + 9) mod 12 |

Next, PUCCH format 2 is a short PUCCH format based on CP-OFDM capable of supporting more than 2 bits of control information. The control information may include each or a combination of HARQ-ACK, CSI, and SR. In PUCCH format 2, when the position of the subcarrier on which the DMRS is transmitted within one OFDM symbol is fixed to subcarriers having indices of #1, #4, #7, and #10 when the index of the first subcarrier is #0. Control information is mapped to the remaining subcarriers except for the subcarrier in which the DMRS is located through a modulation process after channel encoding.

In the present disclosure, the short PUCCH indicates PUCCH format 0 or PUCCH format 2 unless otherwise specified, and the long PUCCH indicates PUCCH format 1, PUCCH format 3, or PUCCH format 4 unless otherwise specified. Also, in the present disclosure, unless otherwise specified, the transmission in PUCCH format X means transmission using a PUCCH resource for PUCCH format X obtained through the method of the present disclosure, such as the indication or inducement from the base station.

Hereinafter, a sleep mode of the UE will be described.

During a time interval T during which the UE does not need to perform any transmission and reception, the UE may operate in a sleep mode to minimize power consumption. The UE may operate in one of the following three sleep modes according to the length of the time interval T during which the UE may operate in the sleep mode.

- Deep sleep: which is a sleep mode in which the UE operate when $T>T_{ds}$. The deep sleep is a mode in which the UE may operate with the lowest power consumption. In the deep sleep, only a minimum baseband operation may be performed, and a radio frequency (RF) circuit may also be deactivated. In order for the UE operating in the deep sleep mode to operate in an active mode (e.g., an active mode for performing transmission and reception), a relatively longer transient time than a certain reference may be required. $T_{ds}$ may be defined as the minimum time interval required for the UE to operate in the deep sleep mode.
- Light sleep: which may correspond to a sleep mode in which the UE may operate when $T_{ls} \leq T \leq T_{ds}$. The light sleep is a mode in which the UE may operate with low power consumption. In the light sleep, a relatively shorter transient time than a certain reference as compared with the deep sleep mode may be required. Tis may be defined as the minimum time interval required for the UE to operate in the light sleep mode.
- Micro sleep: which may correspond to a sleep mode in which the UE may operate when $T_{ms} \leq T \leq T_{ls}$. The micro sleep is a mode in which the UE may operate with relatively low power consumption. In the micro sleep, a transient time required to switch to the active mode may be very short or absent. $T_{ms}$ may be defined as the minimum time interval required for the UE to operate in the micro sleep mode.

According to the above definition, the sleep mode in which the UE may operate according to the length of the time interval T during which the UE may operate in the sleep mode may correspond to at least one of the deep sleep, the light sleep, or the micro sleep. Hereinafter, in the description of the present disclosure, the deep sleep, the light sleep, and the micro sleep are not distinguished and are collectively referred to as the sleep mode.

Hereinafter, embodiments of the present disclosure will be described in detail with reference to the accompanying drawings. Hereinafter, as an embodiment of the present disclosure, a 5G system will be described as an example, but the embodiments of the present disclosure may also be applied to other communication systems having a similar technical background or channel type. For example, LTE or LTE-A mobile communication and mobile communication technologies developed after 5G may be included therein. Therefore, the present disclosure may also be applied to other communication systems through some modifications without departing from the scope of the present disclosure.

Also, in describing the present disclosure, when the detailed description of the relevant functions or configurations is determined to unnecessarily obscure the gist of the present disclosure, the detailed description thereof may be omitted. The terms as used herein are those defined by taking into account functions in the present disclosure, but the terms may vary depending on the intention of users or those of ordinary skill in the art, precedents, or the like. Therefore, the definitions should be made based on the contents throughout the specification.

First Embodiment

A UE may transmit, to a base station, parameters related to transmission and reception preferred by the UE for a specific purpose (e.g., for the purpose of reducing the power consumption of the UE) (or a series of information that may help the base station to set parameters preferred by the UE) by using higher layer signaling (e.g., RRC or MAC CE) or L1 signaling (e.g., PUCCH). A message including parameters related to transmission and reception preferred by the UE, which are transmitted to the base station by the UE, is collectively referred to as "UE assistance information." The UE assistance information may include, for example, one or at least one combination of the following parameters.

- Time domain resource allocation related parameters preferred by UE
    - For example, parameter (K0) indicating a slot in which a PDSCH is scheduled, a parameter (K2) indicating a slot in which a PUSCH is scheduled
- HARQ-ACK timing related parameter for PDSCH preferred by the UE
    - For example, parameter (K1) indicating a slot for transmitting HARQ for PDSCH
- Bandwidth part configuration information preferred by the UE
    - For example, bandwidth part index, bandwidth part bandwidth, bandwidth part frequency position, subcarrier spacing, etc.
- Antenna configuration information preferred by the UE
    - For example, the number of MIMO layers, antenna panel related configuration information
- DRX configuration information preferred by the UE
    - For example, DRX related timer (onDurationTimer, InactivityTimer, HARQ-RTT-TimerDL, HARQ-RTT-TimerUL, RetransmissionTimerDL, RetransmissionTimerUL, DRX cycle and start offset)
- PDCCH related configuration information preferred by the UE (e.g., parameters described in Tables 7 and 8, such as maximum number of blind decoding, maximum number of CCEs, PDCCH monitoring periodicity, number of PDCCH candidates, time and frequency resources of control resource set, etc.)
- PUCCH related configuration information preferred by the UE
    - For example, PUCCH format, number of PUCCH resources, time and frequency resource allocation information of PUCCH, frequency hopping, etc.
- Carrier aggregation related configuration information preferred by the UE
    - For example, whether specific cell is activated or deactivated, number of configured cells or cell groups, cross-carrier scheduling or not, etc.
- Semi-persistent scheduling (SPS) related configuration information preferred by the UE
    - For example, time and frequency resource allocation information, transmission periodicity, HARQ process number, PUCCH configuration, MCS table, etc.
- Configured grant (CG) related configuration information preferred by the UE
    - For example, time and frequency resource allocation information, transmission periodicity, frequency hopping, DMRS configuration, MCS, resource block group (RBG) size, number of repeated transmissions, redundancy version (RV), precoding and number of layers, antenna port, frequency hopping offset, etc.

MCS table related configuration information preferred by the UE

For example, MCS table supporting up to 64 QAM or MCS table supporting up to 256 QAM, etc.

Measurement and reporting related configuration information preferred by the UE

For example, time and frequency resource allocation information and periodicity information for CSI-RS, parameters related to SS/PBCH block based measurement timing configuration (SMTC) setting, etc.

assistance information may be determined and generated by an upper layer of the UE 701.

When the transmission of the UE assistance information is triggered, the UE 701 may transmit a message including the UE assistance information to the base station 700 by using higher layer signaling (e.g., RRC or MAC CE) or L1 signaling (e.g., PUCCH).

The base station may table-configure, to the UE, M candidate groups for a set of parameter values (PowerSavingMode) corresponding to one or at least one combination of parameters corresponding to the UE assistance information through higher layer signaling (e.g., RRC or MAC CE). For example, when M=4, the base station may configure the following table to the UE.

TABLE 14

| | |
|---|---|
| PowerSavingMode#1 | PDCCH related configuration#1, BWP related configuration#1, CA related configuration#1, DRX related configuration#1, antenna related configuration#1, time domain resource allocation related configuration#1, HARQ timing related configuration#1, CSI-RS configuration#1, other transmission and reception related configuration information#1 |
| PowerSavingMode#2 | PDCCH related configuration#2, BWP related configuration#2, CA related configuration#2, DRX related configuration#2, antenna related configuration#2, time domain resource allocation related configuration#2, HARQ timing related configuration#2, CSI-RS configuration#2, other transmission and reception related configuration information#2 |
| PowerSavingMode#3 | PDCCH related configuration#3, BWP related configuration#3, CA related configuration#3, DRX related configuration#3, antenna related configuration#3, time domain resource allocation related configuration#3, HARQ timing related configuration#3, CSI-RS configuration#3, other transmission and reception related configuration information#3 |
| PowerSavingMode#4 | PDCCH related configuration#4, BWP related configuration#4, CA related configuration#4, DRX related configuration#4, antenna related configuration#4, time domain resource allocation related configuration#4, HARQ timing related configuration#4, CSI-RS configuration#4, other transmission and reception related configuration information#4 |

Scheduling delay related configuration information preferred by the UE

For example, delay budget related parameter values (which may be used for DRX configuration purpose), downlink buffer size values, etc.

Sleep mode related configuration information preferred by the UE

For example, time interval operating in preferred sleep mode, periodicity of the corresponding interval, time offset information, etc.

Active mode related configuration information preferred by the UE

For example, time interval operating in preferred active mode, periodicity of the corresponding interval, time offset information, etc.

TDD related configuration information preferred by the UE

For example, uplink slot pattern, downlink slot pattern, slot format, slot format pattern, periodicity in which pattern is repeated, and time offset, etc.

Figure 7:
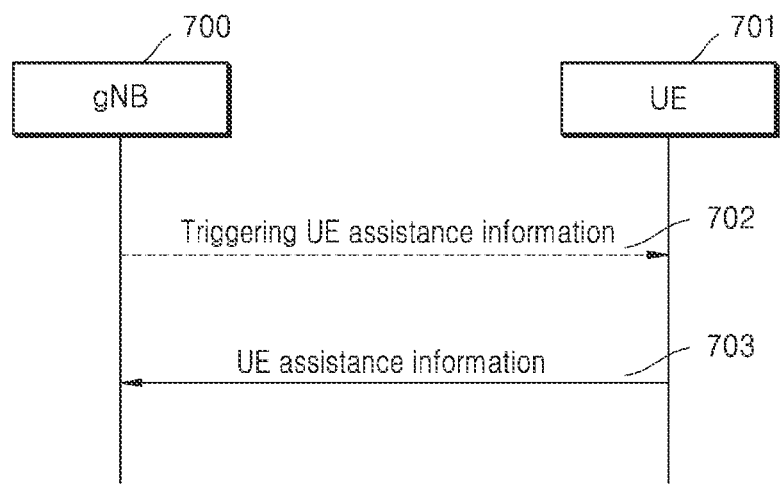
FIG. 7 is a diagram illustrating a first embodiment of the present disclosure.

FIG. 7 is a diagram illustrating operations of a base station and a UE, according to a first embodiment of the present disclosure.

A base station 700 may trigger or request transmission of UE assistance information to the UE 701 by using higher layer signaling (e.g., RRC or MAC CE) or L1 signaling (e.g., PDCCH) (operation 702).

Also, according to an embodiment, operation 702 may be omitted. In this case, the trigger for transmitting the UE The above-described information may be notified from the base station to the UE in the operation (operation 702) of triggering the transmission of the UE assistance information from the base station to the UE. The UE may select one or more candidate groups corresponding to a preferred parameter set from among the M parameter (PowerSavingMode) candidate groups configured from the base station through higher layer signaling (e.g., RRC or MAC CE), and may transmit the selected candidate groups to the base station as a type of UE assistance information.

Second Embodiment

In order to reduce the power consumption of the UE, it may be most important to maximize the interval during which the UE operates in the sleep mode. In order to maximize the interval during which the UE operates in the sleep mode, it is preferable that the UE minimizes the active time. The active time may mean a time interval during which the UE performs a series of all operations related to transmission and reception. The operations related to transmission and reception of the UE may include, for example, at least one of the following operations.

Monitoring for PDCCH

PUCCH transmission (for purposes of scheduling request, HARQ-ACK transmission, CSI transmission, etc.)

Transmission and reception for PDSCH and PUSCH

Transmission and reception for channel state measurement and reporting (channel state such as CSI, RSRP, RSRQ, etc.)

In order to minimize the active time of the UE, it may be very important for the UE to compressively perform all the above-described operations related to transmission and reception for the active time interval for as short a time interval as possible.

According to an embodiment, when data packets of the same size are transmitted and received, it may be better for the UE to receive the corresponding data packet for as short a time as possible from the viewpoint of saving UE power consumption. For example, when the total size of the data packets that the base station wants to transmit to the UE is X Mbytes, the base station may transmit the corresponding data packets over Y slots. In this case, minimizing Y may be effective in reducing the operating time of the UE in the active mode and maximizing the operating time of the UE in the sleep mode. That is, for the purpose of reducing power consumption of a specific UE, the base station may allocate more resources to the corresponding UE on the frequency domain by increasing the scheduling priority of the corresponding UE.

Also, according to an embodiment, it may be good to perform the above-described operations related to transmission and reception of the UE during the same active time interval from the viewpoint of UE power consumption. For example, when time A and time B are required to perform operation A and operation B, respectively, it may be more effective in terms of UE power consumption to perform operation A and operation B for time C (=time A+time B) at the same time point t1 rather than performing operation A and operation B for time A and time B at different times t1 and t2, respectively. This is because additional transition time and transition energy may be consumed when the UE changes from the sleep mode to the active mode or from the active mode to the sleep mode. For example, the transition time and the transition energy according to the change between the deep sleep, the light sleep, and the micro sleep to the active mode may have the following values.

TABLE 15

| Sleep type | Additional transition energy: (Relative power × N ms) | Total transition time |
|---|---|---|
| Deep sleep | 450 | 20 ms |
| Light sleep | 100 | 6 ms |
| Micro sleep | 0 | 0 ms* |

Therefore, it may be effective in terms of UE power consumption to adjust the parameters so that the base station is limited to the same active time interval as much as possible in configuring the operations related to transmission and reception of the UE. For example, the base station may configure the UE to perform operation B (e.g., CSI measurement and reporting) in the slot configured to perform operation A (e.g., monitoring PDCCH). After changing from the sleep mode to the active mode for the operation A in a specific slot, the UE may perform up to the operation B and then return to the sleep mode again.

Figure 8:
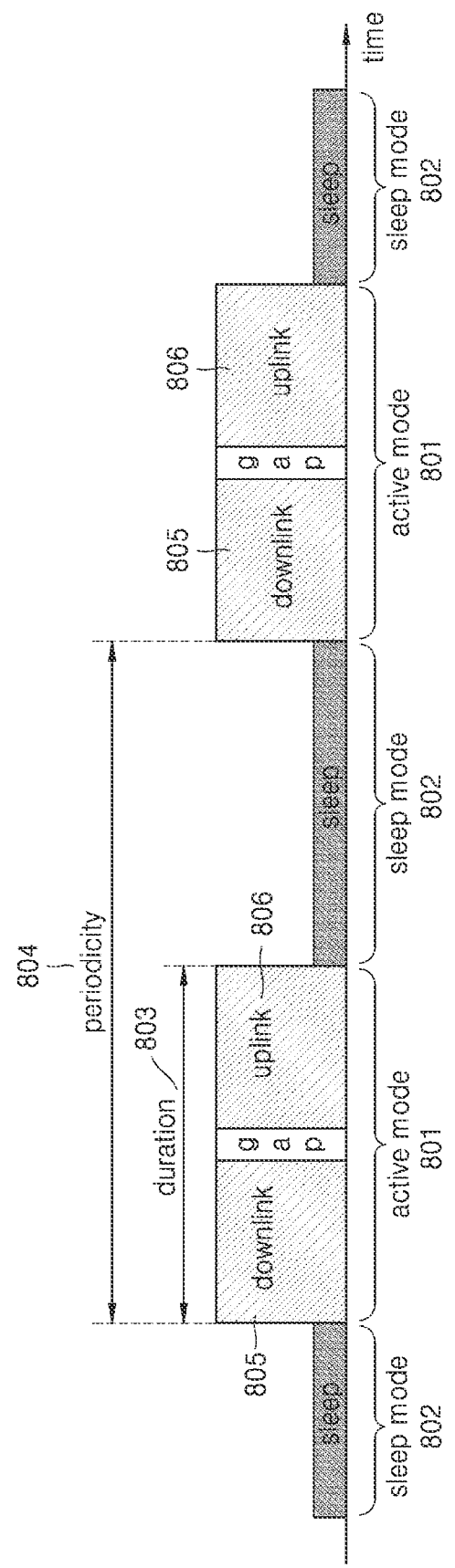
FIG. 8 is a diagram illustrating a second embodiment of the present disclosure.

FIG. 8 illustrates an example of an operation according to a second embodiment of the present disclosure.

In FIG. 8, a series of times during which the UE operates may be divided into a time interval operating in the sleep mode 802 and a time interval operating in the active mode 801. The time interval operating in the sleep mode 802 or the active mode 801 may be repeated at a specific periodicity 804 with a specific duration 803.

The base station may configure, to the UE, a pattern for a time interval operating in the sleep mode 802 or the active mode 801, for example, parameter values for the duration 803, the periodicity 804, time offset, etc., through higher layer signaling (e.g., RRC or MAC CE). The base station may configure or indicate parameters so that all operations related to transmission and reception of the UE may be performed in the time interval corresponding to the active mode 801. For example, the base station may configure or indicate parameters to perform PDCCH monitoring, PDSCH reception, SPS configuration, and channel state measurement (CSI-RS and SMTC resource configuration) for the time corresponding to a downlink 805 in the time interval corresponding to the active mode 801, and may configure or indicate parameters to perform PUSCH transmission, CG configuration, HARQ-ACK transmission for PDSCH, channel state reporting, PDSCH reception, SPS configuration, channel state report for the time corresponding to an uplink 806 in the time interval corresponding to the active mode 801.

More specifically, the base station may configure parameters to the UE so that all downlink transmissions (PDCCH, SPS, periodic channel state measurement, etc.), which may be configured semi-statically by higher layer signaling (e.g., RRC or MAC CE), may be performed only in the time interval corresponding to the downlink 805 of the time interval corresponding to the active mode 801, and may transmit, to the UE, DCI including the indicator so that all downlink transmissions (PDSCH, aperiodic channel state measurement, etc.), which may be dynamically indicated by L1 signaling (e.g. DCI), may be performed only in the time interval corresponding to the downlink 805 of the time interval corresponding to the active mode 801.

Also, according to an embodiment, the base station may configure parameters to the UE so that all uplink transmissions (CG, periodic channel state reporting, scheduling request, etc.), which may be configured semi-statically by higher layer signaling (e.g., RRC or MAC CE), may be performed only in the time interval corresponding to the uplink 806 of the time interval corresponding to the active mode 801, and may transmit, to the UE, DCI including the indicator so that all uplink transmissions (PUSCH, HARQ-ACK feedback for PDSCH, aperiodic channel state reporting, etc.), which may be dynamically indicated by L1 signaling (e.g. DCI), may be performed only in the time interval corresponding to the uplink 806 of the time interval corresponding to the active mode 801.

When the UE is configured from the base station with the pattern for the time interval corresponding to the sleep mode 802 or the active mode 801, the UE may expect transmission and reception only in the time interval corresponding to the active mode 801, and may expect no transmission/reception (that is, related upper layer configuration or L1 indication contents) in the time interval corresponding to the sleep mode 802.

According to an embodiment, the UE may transmit, to the base station, the pattern for the time interval operating in the sleep mode 802 or the active mode 801, for example, parameter values for the duration 803, the periodicity 804, time offset, etc., through higher layer signaling (e.g., RRC or MAC CE) as a type of UE assistance information. The base station may configure or indicate parameters related to transmission and reception based on UE assistance information for the time interval operating in the sleep mode 802 or active mode 801 received from the UE.

According to an embodiment, the base station may configure, to the UE, the pattern for the time interval operating in the sleep mode 802 or the active mode 801, for example, M candidate groups of parameter values for the duration

803, the periodicity 804, time offset, etc., through higher layer signaling (e.g., RRC or MAC CE). The UE may select one or more candidate groups corresponding to a preferred parameter set from among the M candidate groups configured from the base station through higher layer signaling (e.g., RRC or MAC CE), and may transmit the selected candidate groups as a type of UE assistance information. The base station may configure or indicate parameters related to transmission and reception based on UE assistance information for the time interval operating in the sleep mode 802 or active mode 801 received from the UE.

Third Embodiment

In order to minimize the active time of the UE, it may be very important for the UE to compressively perform all the above-described operations related to transmission and reception for the active time interval for as short a time interval as possible.

According to an embodiment, when data packets of the same size are transmitted and received, it may be better for the UE to receive the corresponding data packet for as short a time as possible from the viewpoint of saving UE power consumption. For example, when the total size of the data packets that the base station wants to transmit to the UE is X Mbytes, the base station may transmit the corresponding data packets over Y slots. In this case, minimizing Y may be effective in reducing the operating time of the UE in the active mode and maximizing the operating time of the UE in the sleep mode. Therefore, the size of the downlink data buffer may play a very important role in determining the active mode of the UE.

For example, when the size of the downlink data buffer (that is, the amount of data packets to be transmitted) is less than a specific threshold value, the base station does not schedule the corresponding buffered data to the UE immediately, thereby maximizing the sleep mode interval of the UE. The base station may wait until a sufficient amount of data is buffered. When the size of the downlink data buffer is greater than a specific threshold value and the amount of data packets increases, the base station may perform scheduling to the UE. Therefore, when the UE knows the size of the downlink data buffer in advance, the size of the downlink data buffer may be utilized to determine whether to operate in the active mode or the sleep mode based on this information.

Figure 9:
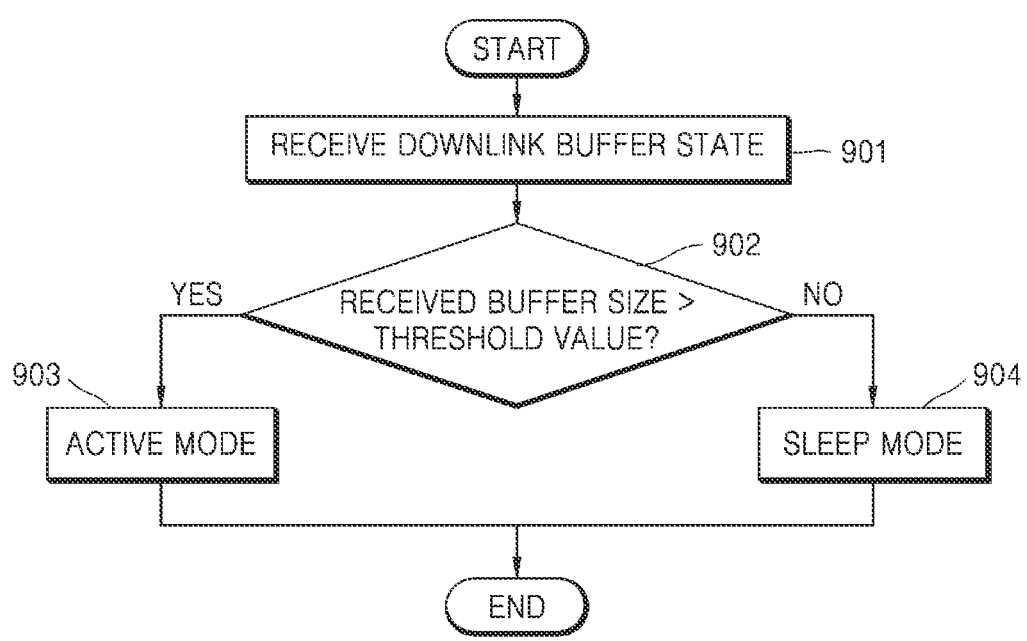
FIG. 9 is a diagram illustrating a third embodiment of the present disclosure.

FIG. 9 is a diagram illustrating an operation of a UE, according to a third embodiment of the present disclosure.

The UE may receive information about the downlink buffer state from the base station (operation 901). The UE may receive information about the downlink buffer state from the base station through higher layer signaling (e.g., RRC, MAC CE, etc.) or L1 signaling (e.g., DCI). The buffer index indicating the downlink buffer state and the buffer size value corresponding to each index may be selected, or may be configured to the UE by the base station through higher layer signaling (e.g., RRC). For example, the downlink buffer state may be selected as shown in the table below.

TABLE 16

| Index | BS value |
| --- | --- |
| 0 | 0 |
| 1 | ≤10 |
| 2 | ≤14 |
| 3 | ≤20 |

TABLE 16-continued

| Index | BS value |
| --- | --- |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 28 | ≤107669 |
| 30 | ≤150000 |
| 31 | >150000 |

The UE may compare whether the received buffer size value is greater than or less than a specific threshold value, based on the received downlink buffer state information (operation 902). The threshold value may be predefined, or may be configured to the UE by the base station through higher layer signaling (e.g., RRC or MAC CE). The UE may transmit one or more values for the preferred threshold value to the base station as a type of UE assistance information. The base station may control the transmission and reception operations based on the preferred threshold value received from the UE.

When it is determined in operation 902 that the received buffer size is greater than the threshold value, the UE may operate in an active mode (operation 903). Operating in the active mode may include an operation related to the monitoring of the PDCCH transmitting the DCI for scheduling at least the PDSCH or the reception of the SPS PDSCH existing at the corresponding time point.

When it is determined in operation 902 that the received buffer size is less than the threshold value, the UE may operate in a sleep mode (operation 904). Alternatively, the UE operates in the active mode, but may not perform an operation related to the monitoring of the PDCCH transmitting the DCI for scheduling the PDSCH or the reception of the SPS PDSCH existing at the corresponding time point.

Fourth Embodiment

When the UE operating as the CA monitors the PDCCH in a plurality of cells, the UE may perform monitoring for the PDCCH by activating both the radio frequency (RF) and baseband (BB) modules of each cell, thereby significantly increasing power consumption of the UE. In particular, performing transmission and reception with a cell in a high frequency band (frequency range 2; corresponding to FR2 or above 6 GHz band) consumes more power than performing transmission and reception with a cell in a low frequency band (frequency range 1; corresponding to FR1 or below 6 GHz band). Therefore, monitoring the PDCCH in each cell in a situation in which both the cell of FR1 and the cell of FR2 are configured may be very inefficient. Therefore, for the purpose of reducing power consumption of the UE, cross-carrier scheduling may be utilized. Cross-carrier scheduling may refer to an operation in which a PDCCH transmitted in a specific cell (cell A) schedules a PDSCH or a PUSCH of another cell (cell B). For example, when the UE is configured with the cell of FR1 and the cell of FR2, the UE may monitor the PDCCH only for the cell of FR1, and scheduling information for the cell of FR2 may be performed in the cell of FR1.

The UE may transmit a message requesting cross-carrier scheduling to the base station. For example, a message requesting the base station to configure cross-carrier scheduling may be transmitted as part of a "CA related configuration preferred by the UE" among the above-described UE assistance information.

According to an embodiment, the UE may transmit a message requesting to configure cross-carrier scheduling for all configured cells. In this case, it may be regarded as performing cross-carrier scheduling for all other cells configured for the UE in a primary cell (PCell). Therefore, the base station may configure, to the UE, cross-carrier scheduling for cells other than the PCell. In this case, the scheduling cell may be limited to the PCell.

Also, according to an embodiment, the UE may transmit a message requesting to configure cross-carrier scheduling for all cells corresponding to FR2 among the configured cells. In this case, one or a part of cells corresponding to FR1 among cells configured to the UE may cross-schedule one or a part of cells corresponding to FR2. Therefore, the base station may configure, to the UE, cross-carrier scheduling for cells corresponding to FR2. In this case, the scheduling cell may be limited to cells existing in FR1.

Also, according to an embodiment, for each configured cell, the UE may transmit, to the base station, preferred index information for a cell performing scheduling for each cell. As a specific example, when a total of four cells (cell #0, cell #1, cell #2, and cell #3) are configured to the UE, information as shown in the table below may be transmitted.

TABLE 17

| cell index | cross-carrier scheduling information (scheduling cell index) |
|---|---|
| 0 | 0 |
| 1 | 0 |
| 2 | 2 |
| 3 | 2 |

In this case, it may correspond to a message requesting cell #0 and cell #1 to perform scheduling in cell #0, and requesting cell #2 and cell #3 to perform scheduled in cell #2.

The UE may transmit the message including the UE assistance information to the base station by using higher layer signaling (e.g., RRC or MAC CE) or L1 signaling (e.g., PUCCH).

Upon receiving the UE assistance information for cross-carrier scheduling from the UE, the base station may notify the appropriate CA related configuration in consideration of the UE's preference.

Figure 10:
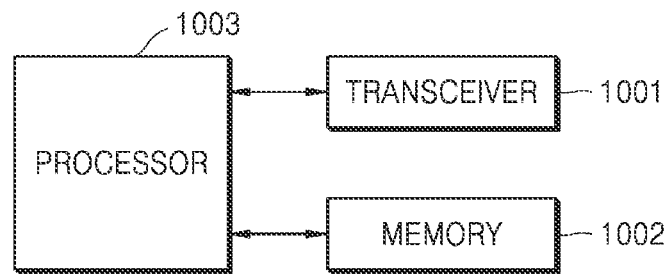
FIG. 10 is a block diagram illustrating an internal structure of a terminal, according to some embodiments of the present disclosure.
Figure 11:
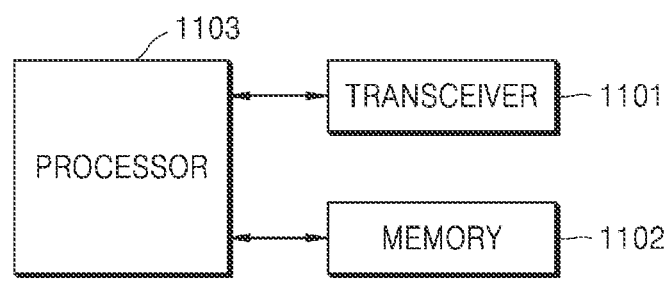
FIG. 11 is a block diagram illustrating an internal structure of a base station, according to some embodiments of the present disclosure.

In order to perform the above embodiments of the present disclosure, transceivers, memories, and processors of a UE and a base station are illustrated in FIGS. 10 and 11, respectively. A method of transmitting UE assistance information corresponding to the above-described embodiments, a method of transmitting and receiving downlink buffer state, and a method of transmitting and receiving data between a base station and a UE for applying a data transmission and reception operation according thereto are illustrated. In order to perform these methods, the transceivers, the memories, and the processors of the base station and the UE have to operate according to the embodiments.

FIG. 10 is a block diagram illustrating a structure of a UE, according to some embodiments of the present disclosure. Referring to FIG. 10, the UE may include a transceiver 1001, a memory 1002, and a processor 1003. However, the elements of the UE are not limited to the above-described example. For example, the UE may include more or fewer elements than the aforementioned elements. Also, the transceiver 1001, the memory 1002, and the processor 1003 of the UE may be implemented in the form of a single chip.

According to an embodiment, the transceiver 1001 may transmit and receive signals with the base station. The signals transmitted and received with the base station may include control information and data. To this end, the transceiver 1001 may include an RF transmitter that performs up-conversion and amplification on a frequency of a signal to be transmitted, and an RF receiver that performs low-noise amplification on a received signal and performs down-conversion on a frequency of the received signal. However, this is only an embodiment of the transceiver 1001, and the elements of the transceiver 1001 are not limited to the RF transmitter and the RF receiver. Also, the transceiver 1001 may receive a signal through a radio channel, output the received signal to the processor 1003, and transmit an output signal of the processor 1003 through a radio channel.

According to an embodiment of the present disclosure, the memory 1002 may store programs and data required for operations of the UE. Also, the memory 1002 may store control information or data included in signals transmitted and received by the UE. The memory 1002 may include a storage medium such as read-only memory (ROM), random access memory (RAM), hard disk, compact disc read-only memory (CD-ROM), and digital versatile disc (DVD), or any combination thereof. Also, the memory 1002 may include a plurality of memories. According to an embodiment, the memory 1002 may store a program for a method of transmitting UE assistance information, a method of transmitting and receiving a downlink buffer state, and a data transmission and reception operation according thereto, which are performed by the UE.

According to an embodiment, the processor 1003 may control a series of processes so that the UE operates according to the above-described embodiment of the present disclosure. For example, the processor 1003 may differently control the method of transmitting UE assistance information, the method of transmitting and receiving the downlink buffer state, and the data transmission and reception operation according thereto. Also, the processor 1003 may include a plurality of processors. The processor 1003 may execute the program stored in the memory 1002 to differently control the method of transmitting UE assistance information, the method of transmitting and receiving the downlink buffer state, and the data transmission and reception operation according thereto.

FIG. 11 is a block diagram illustrating a structure of a base station, according to some embodiments of the present disclosure. Referring to FIG. 11, the base station may include a transceiver 1101, a memory 1102, and a processor 1103. However, the elements of the base station are not limited to the above-described example. For example, the base station may include more or fewer elements than the aforementioned elements. Also, the transceiver 1101, the memory 1102, and the processor 1103 of the UE may be implemented in the form of a single chip.

According to an embodiment, the transceiver 1101 may transmit and receive signals with the UE. The signals transmitted and received with the UE may include control information and data. To this end, the transceiver 1101 may include an RF transmitter that performs up-conversion and amplification on a frequency of a signal to be transmitted, and an RF receiver that performs low-noise amplification on a received signal and performs down-conversion on a frequency of the received signal. However, this is only an embodiment of the transceiver 1101, and the elements of the transceiver 1101 are not limited to the RF transmitter and the RF receiver. Also, the transceiver 1101 may receive a signal through a radio channel, output the received signal to the processor 1103, and transmit an output signal of the processor 1103 through a radio channel.

According to an embodiment of the present disclosure, the memory 1102 may store programs and data required for operations of the UE. Also, the memory 1102 may store control information or data included in signals transmitted and received by the UE. The memory 1102 may include a storage medium such as ROM, RAM, hard disk, CD-ROM, and DVD, or any combination thereof. Also, the memory 1102 may include a plurality of memories. According to an embodiment, the memory 1102 may store a program for a method of configuring transmission and reception parameters based on UE assistance information, a method of transmitting a downlink buffer state, and a data transmission and reception operation according thereto, which are performed by the base station.

According to an embodiment, the processor 1103 may control a series of processes so that the base station operates according to the above-described embodiment of the present disclosure. For example, the processor 1103 may differently control the method of configuring transmission and reception parameters based on UE assistance information, the method of transmitting the downlink buffer state, and the data transmission and reception operation according thereto. Also, the processor 1103 may include a plurality of processors. The processor 1103 may execute the program stored in the memory 1102 to differently control the method of configuring transmission and reception parameters based on UE assistance information, the method of transmitting and receiving the downlink buffer state, and the data transmission and reception operation according thereto.

The methods according to the embodiments of the present disclosure, which are described in the claims or the detailed description, may be implemented as hardware, software, or a combination of hardware and software.

When implemented as software, a computer-readable storage medium storing one or more programs (software modules) may be provided. One or more programs stored in the computer-readable storage medium are configured to be executable by one or more processors in an electronic device. One or more programs include instructions that cause the electronic device to execute the methods according to the embodiments of the present disclosure, which are described in the claims or the specification of the present disclosure.

One or more programs (software modules, software, etc.) may be stored in RAM, non-volatile memory including flash memory, ROM, electrically erasable programmable read only memory (EEPROM), magnetic disc storage device, CD-ROM, DVD, other types of optical storage devices, or magnetic cassette. Alternatively, one or more programs may be stored in a memory provided by a combination of all or part of these devices. Also, each memory may include a plurality of configured memories.

Also, one or more programs may be stored in an attachable storage device that is accessible through a communication network such as Internet, intranet, local area network (LAN), wide LAN (WLAN), or storage area network (SAN), or communication network provided by a combination thereof. These storage devices may be connected through an external port to a device that performs the embodiments of the present disclosure. Also, a separate storage device on the communication network may access the device that performs the embodiment of the present disclosure.

In specific embodiments of the present disclosure, the elements included in the present disclosure have been expressed in the singular or plural form according to the suggested specific embodiments of the present disclosure. However, the expression in the singular or plural form is appropriately selected according to the suggested situations for convenience of explanation and is not intended to limit the present disclosure to the single or plural elements. Even when a certain element is expressed in the plural form, it may be provided with a single element, and even when a certain element is expressed in the singular form, it may be provided with a plurality of elements.

In specific embodiments of the present disclosure, the elements included in the present disclosure have been expressed in the singular or plural form according to the suggested specific embodiments of the present disclosure. However, the expression in the singular or plural form is appropriately selected according to the suggested situations for convenience of explanation and is not intended to limit the present disclosure to the single or plural elements. Even when a certain element is expressed in the plural form, it may be provided with a single element, and even when a certain element is expressed in the singular form, it may be provided with a plurality of elements.

The embodiments of the present disclosure, which are described in this specification and drawings, are merely presented as specific examples so as to easily explain the technical contents of the present disclosure and help the understanding of the present disclosure and are not intended to limit the scope of the present disclosure. That is, it will be obvious to those of ordinary skill in the art that other modifications based on the technical idea of the present disclosure may be made. In addition, the respective embodiments may be operated in combination with each other as necessary. For example, parts of one embodiment and another embodiment of the present disclosure may be combined with each other so that the base station and the UE operate. Also, the embodiments of the present disclosure are applicable to other communication systems, and other modifications based on the technical spirit of the embodiments may also be implemented.

The invention claimed is:

1. A method, performed by a user equipment (UE), the method comprising:
receiving, from a base station, information about at least one power saving mode candidate set;
selecting at least one of the at least one power saving mode candidate set;
transmitting, to the base station, UE assistance information including at least one of information about the selected at least one power saving mode candidate or information about an active window;

receiving, from the base station, a sleep mode pattern configuration information of the UE, determined by the base station based on the UE assistance information; and performing communication with the base station based on a power saving mode determined by the base station based on the UE assistance information, wherein the power saving mode is at least one combination of transmission and reception related parameters; and wherein the information about the active time window includes a sleep mode time pattern preferred by the UE.

2. The method of claim 1, further comprising receiving, from the base station, a request for the UE assistance information through a higher layer signal or L1 signaling.

3. The method of claim 1, wherein the sleep mode pattern configuration information comprises at least one of periodicity information, duration information, and offset information of a sleep mode of the UE, periodicity information, duration information, and offset information of an active mode of the UE, information related to an uplink transmission parameter executed in the active mode, or information related to a downlink reception parameter executed in the active mode.

4. The method of claim 1, wherein the UE assistance information comprises downlink data buffer size information preferred by the UE, and the method further comprises receiving a threshold value determined by the base station based on the downlink data buffer size information preferred by the UE.

5. The method of claim 4, further comprising:

receiving the downlink data buffer size information from the base station;

comparing the buffer size information with the determined threshold value; and determining whether to operate in a sleep mode or an active mode, based on a result of the comparing, and at least one of performing physical downlink control channel (PDCCH) monitoring or receiving physical downlink shared channel semi-persistent scheduling (SPS PDSCH) is performed in the active mode.

6. The method of claim 1, wherein the UE assistance information comprises cross-carrier scheduling information preferred by the UE, the method further comprises receiving cross-carrier scheduling configuration information determined by the base station, based on the UE assistance information, and the cross-carrier scheduling configuration information is to configure at least one of a primary cell or a frequency range1 (FR1) cell as a scheduling cell.

7. The method of claim 6, wherein the cross-carrier scheduling information preferred by the UE comprises index information of a cell performing scheduling of at least one cell.

8. A method, performed by a base station, the method comprising:

transmitting, to a user equipment (UE), information about at least one power saving mode candidate set;

receiving, from the UE, UE assistance information including at least one of information about a selected at least one power saving mode candidate or information about an active time window;

determining a power saving mode based on the UE assistance information;

transmitting, to the UE, a sleep mode pattern configuration information of the UE, based on the UE assistance information; and performing communication with the UE based on the determined power saving mode, wherein the power saving mode is at least one combination of transmission and reception related parameters.

9. A user equipment (UE) in a wireless communication system, the UE comprising:

a transceiver; and a processor connected to the transceiver and configured to:

receive, from a base station, information about at least one power saving mode candidate set, select at least one of the at least one power saving mode candidate set, transmit, to the base station, a UE assistance information including at least one of information about the selected at least one power saving mode candidate or information about an active time window, receive, from the base station, a sleep mode pattern configuration information of the UE, determined by the base station based on the UE assistance information, and perform communication with the base station based on a power saving mode determined by the base station based on the UE assistance information, wherein the power saving mode is at least one combination of transmission and reception related parameters.

10. The UE of claim 9, wherein the processor is further configured to receive, from the base station, a request for the UE assistance information through a higher layer signal or L1 signaling.

11. The UE of claim 9, wherein the UE assistance information comprises downlink data buffer size information preferred by the UE, and the processor is further configured to receive a threshold value determined by the base station based on the downlink data buffer size information preferred by the UE.

12. The UE of claim 9, wherein the UE assistance information comprises cross-carrier scheduling information preferred by the UE, the processor is further configured to receive cross-carrier scheduling configuration information determined by the base station, based on the UE assistance information, and the cross-carrier scheduling configuration information is to configure at least one of a primary cell or a frequency range1 (FR1) cell as a scheduling cell.

13. A base station in a wireless communication system, the base station comprising:

a transceiver; and a processor connected to the transceiver and configured to:

transmit, to a user equipment (UE), information about at least one power saving mode candidate set, receive, from the UE, UE assistance information including at least one of information about a selected at least one power saving mode candidate or information about an active time window, determine a power saving mode based on the UE assistance information, transmit, to the UE, a sleep mode pattern configuration information of the UE, based on the UE assistance information, and perform communication with the UE based on the determined power saving mode,
wherein the power saving mode is at least one combination of transmission and reception related parameters.

* * * * *